United States Patent [19]

Akashi et al.

[11] Patent Number: 5,151,732
[45] Date of Patent: Sep. 29, 1992

[54] AUTOMATIC FOCUSING APPARATUS

[75] Inventors: Akira Akashi; Terutake Kadohara, both of Yokohama, Japan

[73] Assignee: Canon Kabushiki Kaisha, Tokyo, Japan

[21] Appl. No.: 742,475

[22] Filed: Aug. 5, 1991

Related U.S. Application Data

[63] Continuation of Ser. No. 400,924, Aug. 30, 1989.

[30] Foreign Application Priority Data

Aug. 31, 1988 [JP] Japan .................................. 63-216903
Aug. 31, 1988 [JP] Japan .................................. 63-216904

[51] Int. Cl.⁵ .......................................... G03B 13/36
[52] U.S. Cl. ................................ 354/402; 250/201.2
[58] Field of Search ............... 354/402, 406, 407, 408; 250/201.2, 201.7, 201.8; 358/213.19, 213.26, 227

[56] References Cited

U.S. PATENT DOCUMENTS

| | | | |
|---|---|---|---|
| 4,329,577 | 5/1982 | Asano et al. | 250/201 |
| 4,460,261 | 7/1984 | Equchi et al. | 354/408 |
| 4,701,626 | 10/1987 | Ishizaki et al. | 358/213.19 X |
| 4,831,403 | 5/1989 | Ishida et al. | 354/402 |

FOREIGN PATENT DOCUMENTS

| | | |
|---|---|---|
| 2093988 | 9/1982 | United Kingdom . |
| 2138130 | 10/1984 | United Kingdom . |
| 2183419 | 6/1987 | United Kingdom . |
| 2200010 | 7/1988 | United Kingdom . |

*Primary Examiner*—W. B. Perkey
*Attorney, Agent, or Firm*—Fitzpatrick, Cella, Harper & Scinto

[57] ABSTRACT

An automatic focussing apparatus having a plurality of sensors of the signal accumulation type includes a plurality of accumulation-type sensor sections for respectively receiving light from different object areas. Each sensor section produces, in response to a first signal, a signal which is variable in accordance with an amount of light received thereby. The signal produced by each sensor section is independently output to a signal processing circuit through an output terminal portion in response to a second signal. A control circuit supplies the first signal to each sensor section substantially at the same time, and monitors a signal producing state of each sensor section independently. The control circuit then supplies the second signal to the sensor section which reaches a predetermined monitoring state.

16 Claims, 22 Drawing Sheets

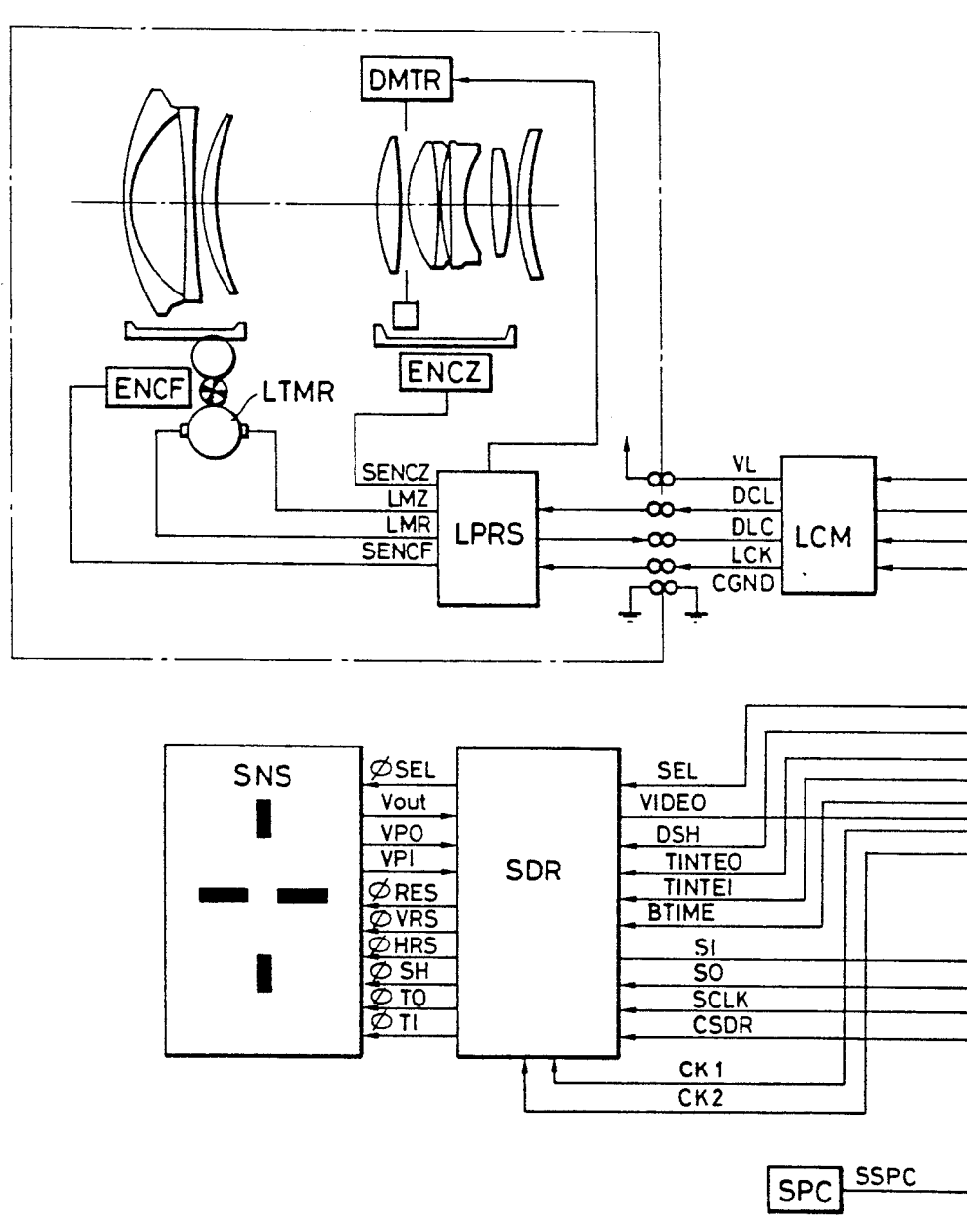

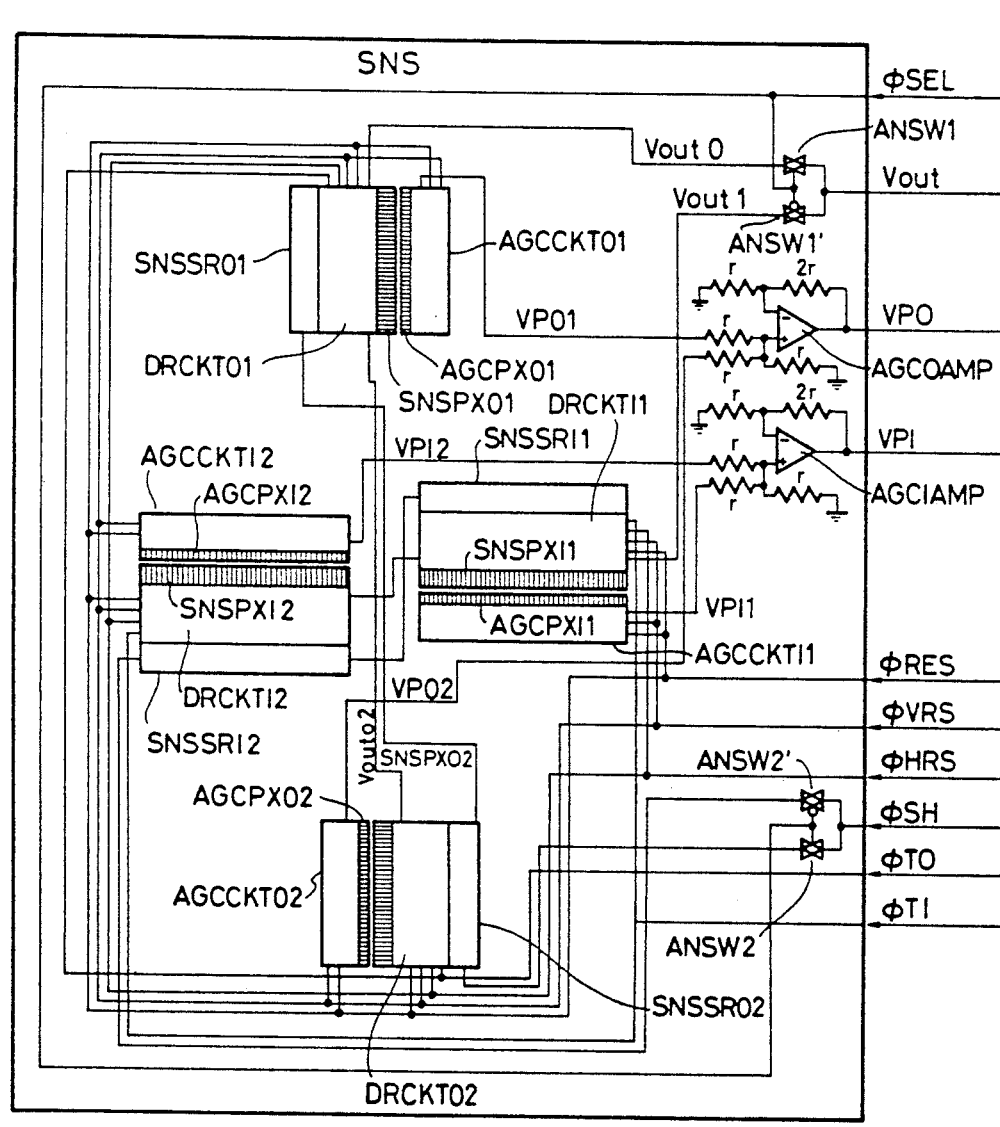

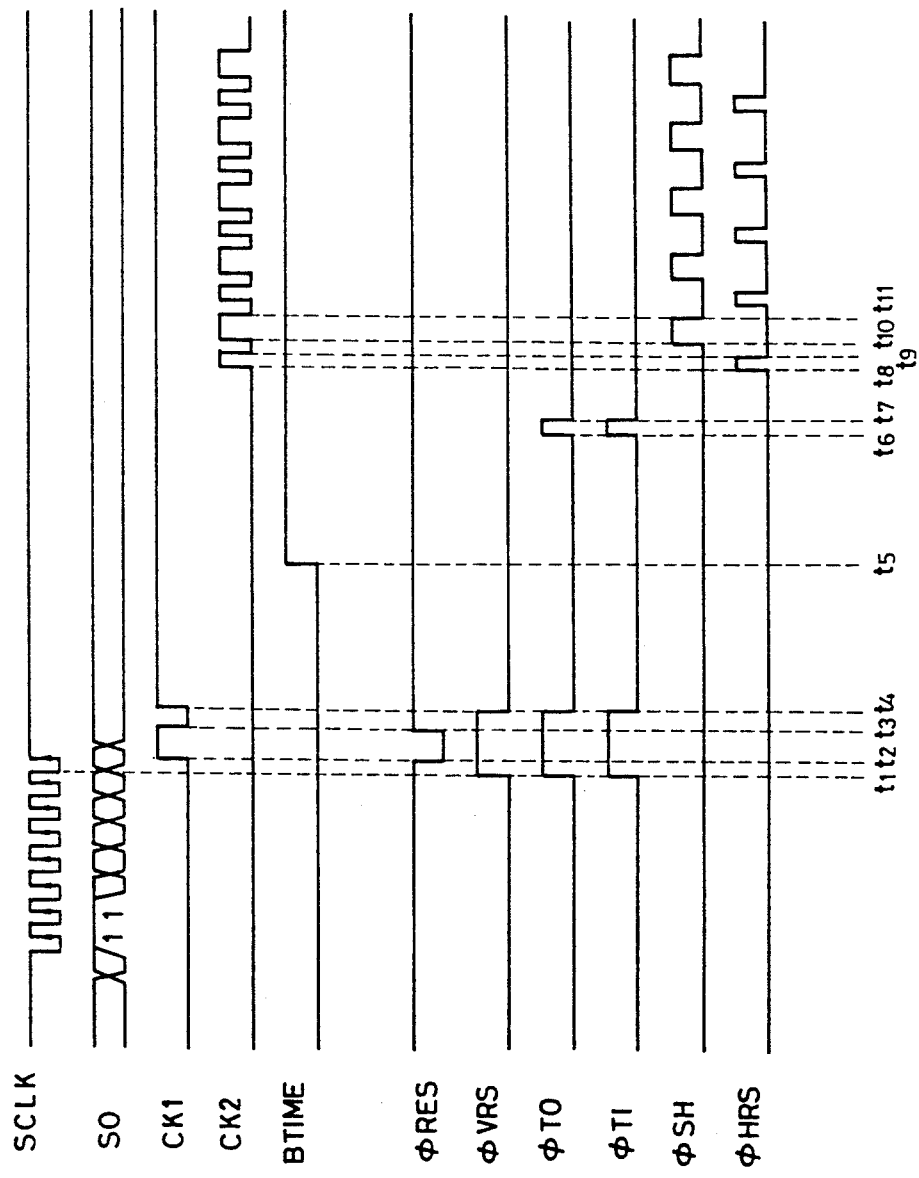

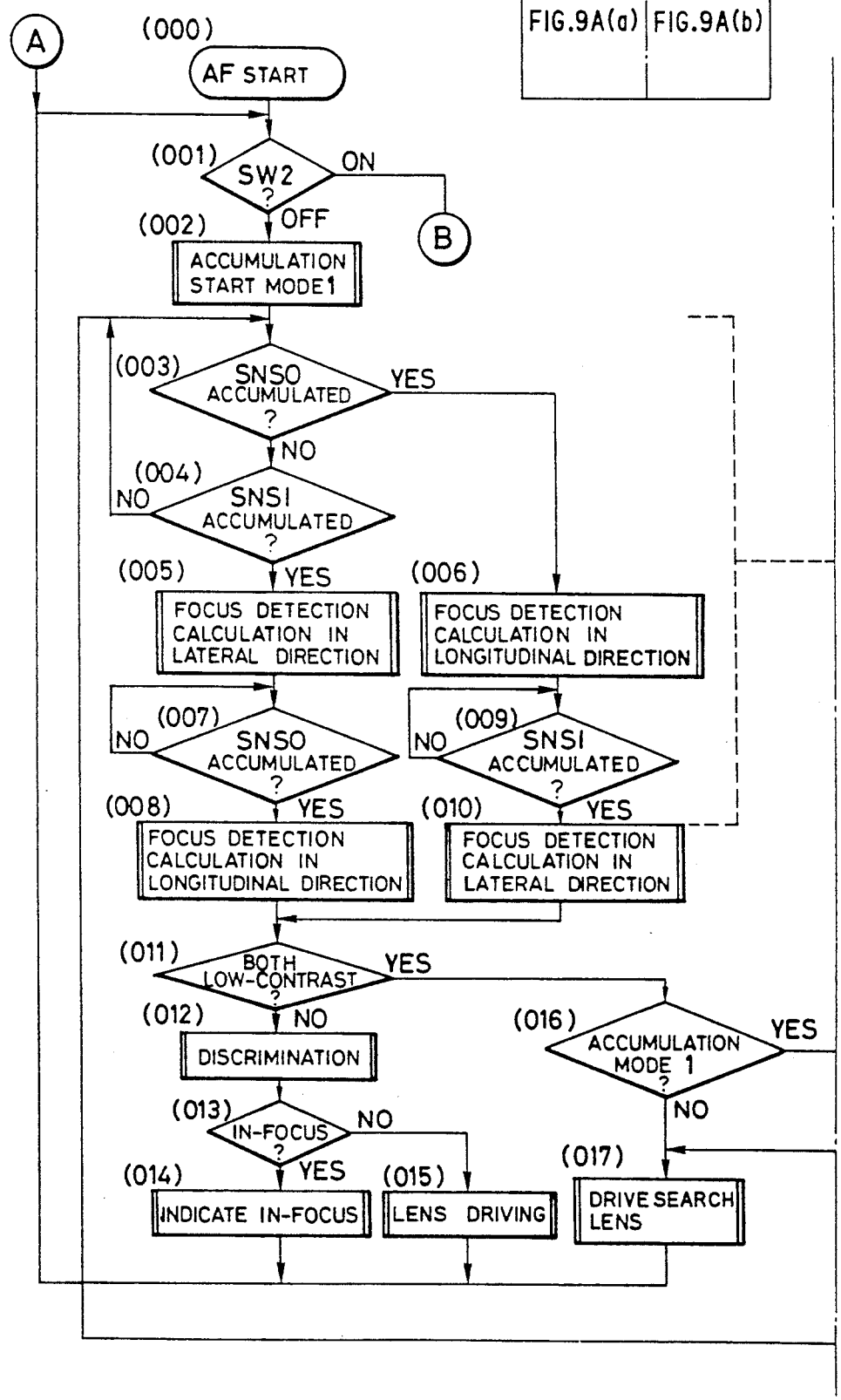

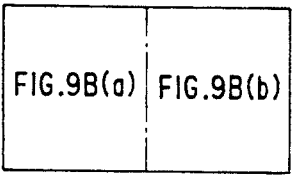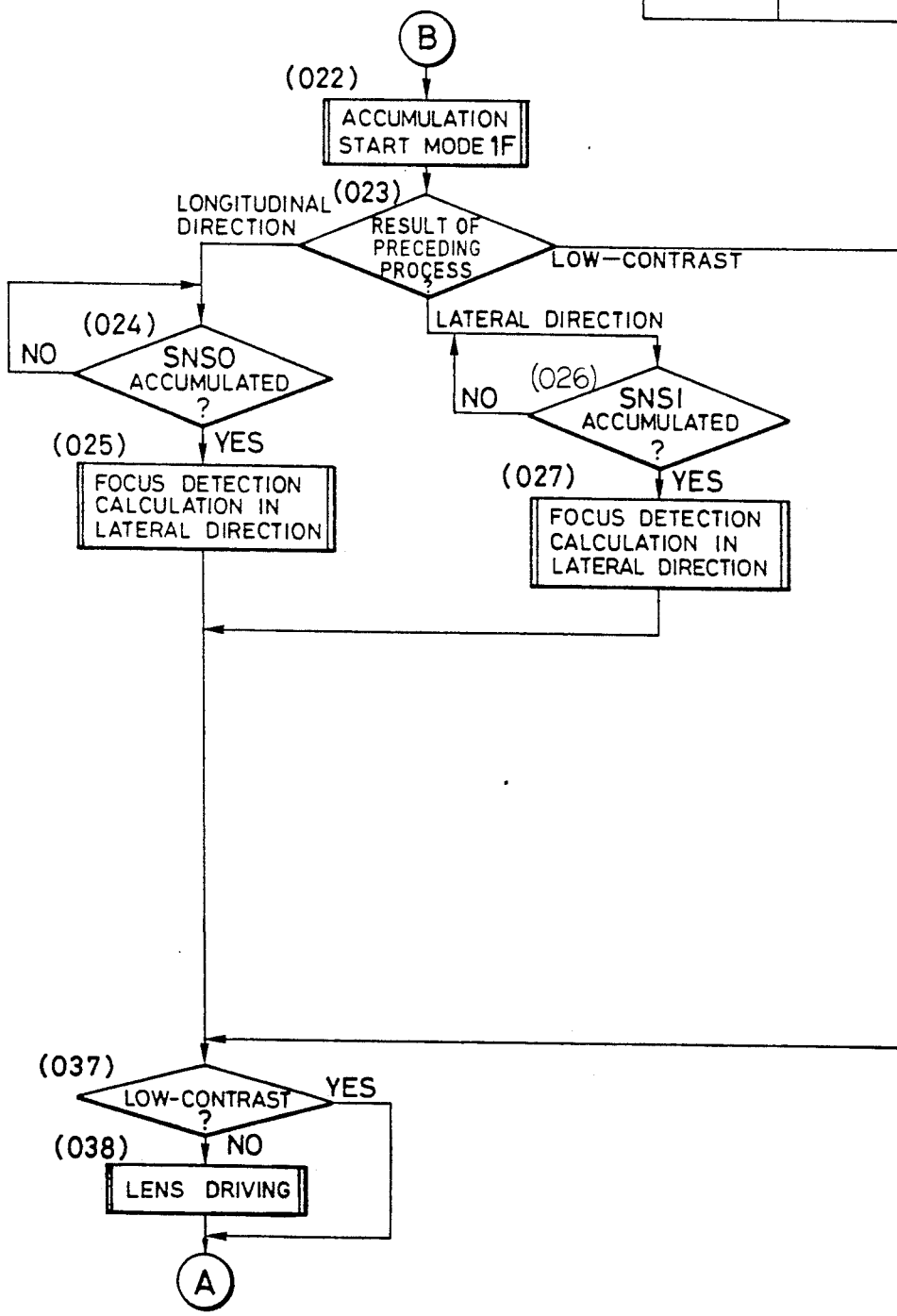

FIG. 12

| GSET1 * | GSET2 * | AND 21 | AND 22 | AND 23 | GAIN |
|---------|---------|--------|--------|--------|------|
| 0 | 0 | 1 | 0 | 0 | 1 |
| 0 | 1 | 0 | 1 | 0 | 2 |
| 1 | 0 | 0 | 0 | 1 | 4 |
| 1 | 1 | 0 | 0 | 0 | 8 |

AUTOMATIC FOCUSING APPARATUS

This application is a continuation of application Ser. No. 07/400,924 filed Aug. 30, 1989, now abandoned.

BACKGROUND OF THE INVENTION

1. Field of the Invention

The present invention relates to a focus detection apparatus for a camera or the like.

2. Related Art

In a conventional focus detection apparatus for a single-lens reflex camera, two images of light beams which pass through two different pupil regions of a photographing lens are received by a pair of sensor arrays and are photoelectrically converted therein. A relative positional displacement of the image signals as output from the pair of sensor arrays is obtained to detect an amount of out-of-focus (defocus amount) of the photographing lens. In this case, since only a brightness distribution of a specific area of the object space is detected by the pair of sensors, a defocus amount cannot be detected in an object having no brightness distribution in the specific area.

A plurality of sensor pairs and the corresponding focus detection optical systems are prepared to extract brightness distributions of the plurality of areas. Therefore, focus detection for many objects has been attempted, as disclosed in Japanese Patent Publication No. 59-28886, Japanese Patent Laid-Open No. 62-212611, and Japanese Patent Application No. 62-234895 filed by the assignee of the present application.

When an accumulation type sensor is used, accumulation time must be optimally controlled in accordance with an object brightness level in order to cause an output signal from the sensor to fall within the dynamic range of a processing system. In a system having the plurality of sensor pairs, when the accumulation operations of all the sensors are completed within the same accumulation time, different brightness levels are obtained since spatial areas of the object extracted by the respective sensor pairs are different. Therefore, the range of image signals thus obtained from the sensors may not fall within the dynamic range of the processing system.

For example, if a given portion corresponding to an object has a high brightness level and the accumulation time is shortened in accordance with a sensor pair corresponding to the given portion, object patterns are rarely obtained from other sensors corresponding to dark portions, resulting in inconvenience.

When a brightness distribution of the plurality of object areas is extracted to perform different focus detection operations in units of areas, one of a plurality of focus detection results must be selected and used as a final defocus amount. In order to eliminate this drawback, Japanese Patent Laid-Open No. 62-212611 discloses a technique for selecting a sensor output having the highest contrast level of the plurality of sensor outputs and performing focus detection by using the selected sensor output.

When an actual phase difference type focus detection optical system is taken into consideration, different base line lengths as the reference for precision are often employed between a plurality of optical systems. In this focus detection apparatus, the contrast levels of the sensor outputs cannot determine the precision of detection results of the focus detection mechanisms. Therefore, wrong selection may be made if the selection is based on only contrast factors.

SUMMARY OF THE INVENTION

One aspect of the present invention is to provide a camera having a focus detection apparatus or an automatic focusing apparatus, wherein there are provided an object brightness monitor function for independently receiving light beams from different areas of a plurality of accumulation type sensor arrays and an accumulation end function, thereby optimally controlling the accumulation in units of sensor pairs.

Another aspect of the present invention is to provide a camera having a focus detection apparatus or an automatic focusing apparatus, wherein sensor outputs are sequentially read from sensor pairs which have finished accumulations in a time sequence, and focus detection operations are performed in an order of read sensor outputs.

Still another aspect of the present invention is to provide a camera having a focus detection apparatus or an automatic focusing apparatus, wherein contrast levels of outputs from a plurality of sensor pairs are compared with each other in consideration of sensor pair characteristics such as base line lengths of sensor pairs when the levels are compared with each other to select a sensor output having the highest contrast level and then focus processing is performed on the basis of the selected sensor pair output.

BRIEF DESCRIPTION OF THE DRAWINGS

FIG. 2 comprising FIGS. 2a and 2b is a circuit diagram showing an embodiment of the camera according to the present invention;

FIG. 3 comprising FIGS. 3a and 3b is a circuit diagram showing arrangements of a sensor unit SNS and a sensor driver SDR shown in FIG. 2;

FIGS. 5A, 5B, and 5C are waveform charts for explaining sensor drive timings;

FIGS. 12 and 13 are views for explaining an operation of the present invention.

DESCRIPTION OF THE EMBODIMENT OF THE INVENTION

A preferred embodiment of the present invention will be described with reference to the accompanying drawings.

Figure 1:
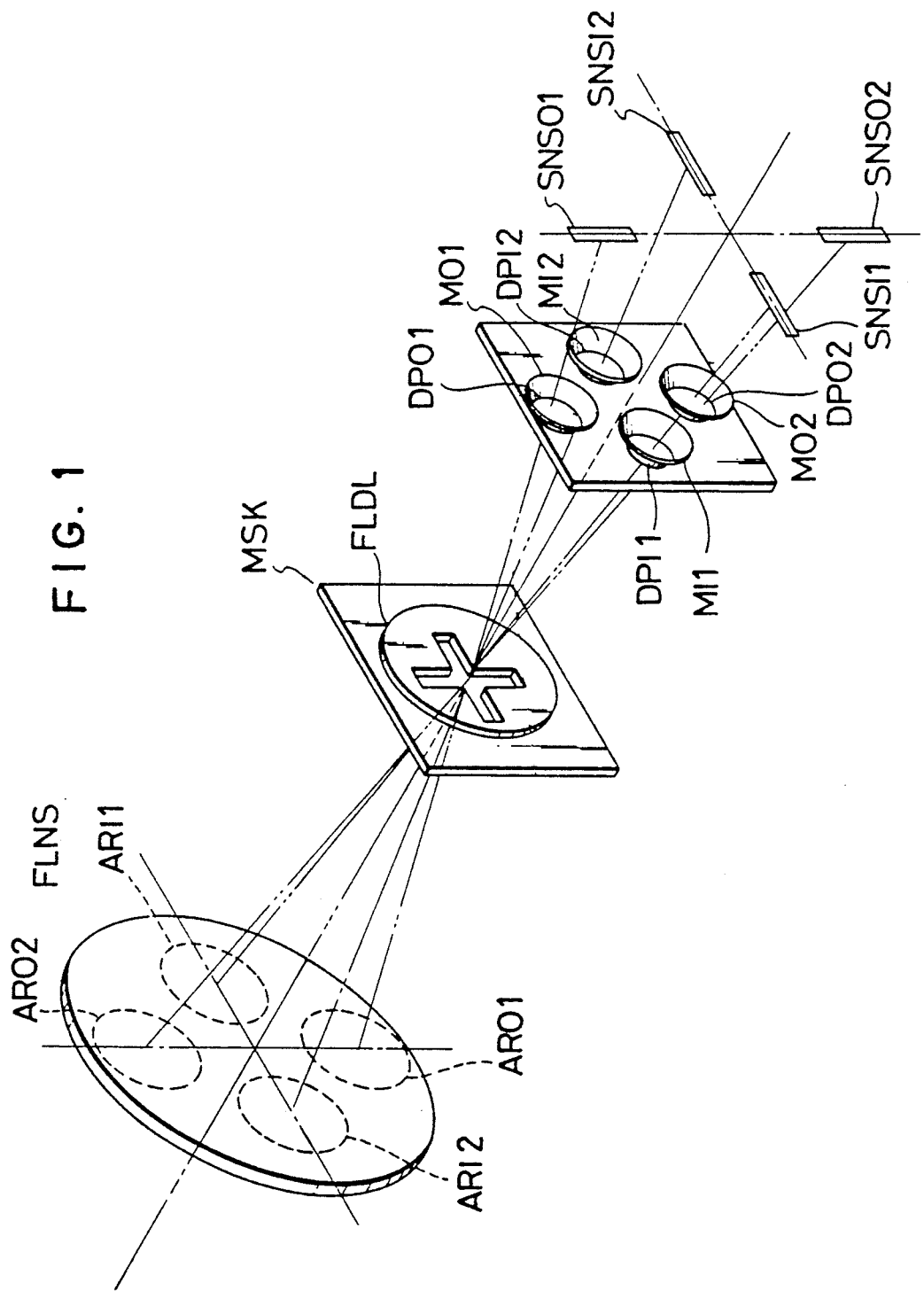
FIG. 1 is an optical diagram of a focus detection system in an automatic focusing control apparatus for a camera according to an embodiment of the present invention.

FIG. 1 shows an optical system used in a focus detection apparatus according to the present invention.

The optical system includes an objective lens (photographing lens) FLNS, a view mask MSK located near a prospective focal plane, a field lens FLDL, a pair of lenses MI1 and MI2 (constituting a secondary optical system) and a pair of lenses MO1 and MO2 (constituting another secondary optical system) located symmetrical about an optical axis of the objective lens FLNS and perpendicular to each other with different base line lengths. In this embodiment, the base line length of the pair of lenses MO1 and MO2 is set to be longer than that of the pair of lenses MI1 and MI2.

A pair of sensor arrays SNSI1 and SNSI2 are arranged behind the pair of lenses MI1 and MI2, respectively. Similarly, a pair of sensor arrays SNSO1 and SNSO2 are arranged behind the pair of lenses MO1 and MO2, respectively. Diaphragms DPI1 and DPI2 are arranged in correspondence with the pair of lenses MI1 and MI2, respectively. Diaphragms DPO1 and DPO2 are arranged in correspondence with the pair of lenses $\overline{MO}1$ and $\overline{MO}2$, respectively.

The field lens FLDL has a focusing function for focusing the diaphragms DPI1 and DPI2 on exit pupil areas ARI1 and ARI2 and the diaphragms DPO1 and DPO2 on exit pupil areas ARO1 and ARO2 of the objective lens FLNS. Beams passing through the areas ARI1 and ARI2 are incident on the sensor arrays SNSI1 and SNSI2, respectively. Similarly, beams passing through the areas ARO1 and ARO2 are incident on the sensor arrays SNSO1 and SNSO2, respectively.

In the focus detection system shown in FIG. 1, when a focal point of the objective lens FLNS is located in front of the prospective focal plane, object images formed on the sensor pairs come close to each other. When the focal point of the objective lens FLNS is located behind the prospective focal plane, objective images formed on the sensor pairs are separated from each other. A relative displacement of the object images has a specific functional relationship with the defocus amounts. When appropriate calculations are performed for sensor outputs in each sensor pair, a defocus amount of the objective lens can be detected.

In this optical system, the pair of sensors SNSO1 and SNSO2 extract a light amount distribution of the object in the longitudinal direction. The pair of sensors SNSI1 and SNSI2 extract a light amount distribution in the lateral direction. Therefore, this optical system can cope with various types of object patterns. Since the base line of the secondary optical system (MO1 and MO2) in the longitudinal direction is longer than that of the secondary optical system (MI1 and MI2) in the lateral direction, the relative positional displacement of the object image in the longitudinal direction is larger than that in the lateral direction. Therefore, longitudinal focal detection is more accurate than lateral focal detection. Since the relative positional displacement in the lateral direction is small, a lateral defocus amount larger than a longitudinal defocus amount can be detected.

Figure 2B:
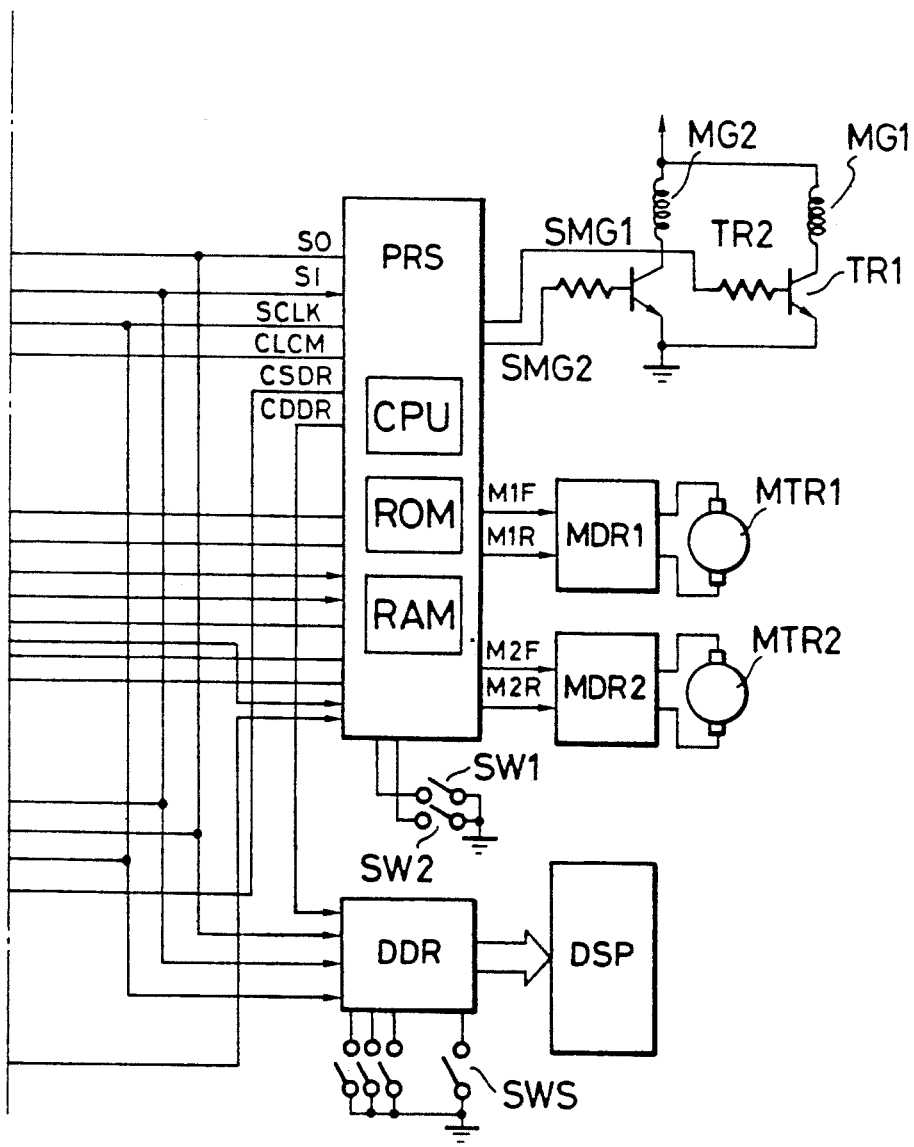

FIG. 2 is a circuit diagram for explaining an arrangement of the camera including the focus detection apparatus according to the present invention. The arrangements of the respective circuit components will be described below.

Referring to FIG. 2, a camera controller (to be referred to as a computer hereinafter) PRS comprises a one-chip microcomputer having a CPU (central processing unit), a ROM, a RAM, and an A/D conversion function. The computer PRS performs a series of operations such as automatic exposure (AE) control function and an automatic focus (AF) control function, a film winding/rewinding operation in accordance with camera sequence programs stored in the ROM. For this purpose, the computer PRS communicates with peripheral circuits in a camera body and a controller in a lens by using communication signals SO, SI, SCLK, and communication selection signals CLCM, CSDR, and CDDR, thereby controlling the operations of the respective circuits and the lens.

The data signal SO is output from the computer PRS, and the data signal SI is input thereto. The data signals SO and SI are output and input in response to the sync clock signal SCLK.

A lens communication buffer circuit LCM supplies power to a lens power source terminal VL during the operation of the camera. The lens communication buffer circuit LCM serves as a communication buffer between the camera and the lens when the selection signal CLCM from the computer PRS is set at a high-potential level (to be referred to as "H" level hereinafter; and a low-potential level is referred to as "L" level hereinafter).

When the computer PRS sets the signal CLCM at "H" level and outputs predetermined data in the form of the output signal SO in synchronism with the signal SCLK, the buffer circuit LCM outputs buffer signals LCK and DCL of the signal SCLK and the signal SO through communication contacts between the camera and the lens. At the same time, a buffer signal of a signal DLC from the lens is output as the input signal SI. The computer PRS receives the lens data as the input signal SI in synchronism with the clock signal SCLK. A switch detection and display circuit DDR is selected when the signal CDDR is set at "H" level and is controlled by the computer PRS using the signals SO, SI, and SCLK. More specifically, the circuit DDR changes a display content of a display member DSP of the camera on the basis of the data sent from the computer PRS and informs the computer PRS of the ON/OFF states of various operation members of the camera through communication.

Switches SW1 and SW2 are interlocked with a release button (not shown). The switch SW1 is turned on upon the first half depression of the release button, and the switch SW2 is turned with the second half depression of the release button. The computer PRS performs photometric and AF operations when the switch SW1 is turned on. The computer PRS performs AE control and subsequent film winding by using an ON signal as a trigger signal from the switch SW2.

The switch SW2 is connected to an "interruption input terminal" of the computer PRS. Even during execution of a program upon an ON operation of the switch SW1, an ON signal from the switch SW2 interrupts the presently executed program, so that a predetermined interruption program is immediately executed.

A film feed motor MRT1 and a mirror up/down and shutter spring charge motor MRT2 are driven by drivers MDR1 and MDR2, respectively. These motors are reversible motors which can be rotated in the forward and reverse directions. Signals M1F, M1R, M2F, and M2R input from the computer PRS to the motor drivers MDR1 and MDR2 are motor control signals.

Shutter front and rear curtain drive start magnets MG1 and MG2 are energized by amplification transistors TR1 and TR2 in response to signals SMG1 and SMG2, so that shutter control is performed by the computer PRS.

The switch detection and display circuit DDR, the motor drivers MDR1 and MDR2, and shutter control are not directly associated with the present invention, and a detailed description thereof will be omitted.

A control circuit LPRS is arranged in the lens. The signal DCL input in synchronism with a clock signal CLK is instruction data input from the camera to a photographing lens LNS. Lens operations according to the instruction are predetermined. The control circuit LPRS analyzes the instruction in accordance with a predetermined sequence and performs AF control and AE control and outputs data representing operating states of the respective components (e.g., driving states of focus control optical system and diaphragms) and various parameters (the smallest f-number, a focal length, and a coefficient of a displacement of defocus amount vs. focus control optical system).

In this embodiment, the lens is exemplified by a zoom lens. When a focus control instruction is sent from the camera to the zoom lens, a focus control motor LTMR is driven by signals LMF and LMR in accordance with data representing the drive amount and its direction. The focus control optical system is moved in the direction of the optical axis, thereby performing focus control. A displacement of the optical system is controlled as follows. A pattern on a signal plate pivoted interlocking with the optical system is detected by a photocoupler, a pulse signal SENCF from an encoder circuit NCF for outputting signals corresponding to the displacement is monitored, and the number of signals is counted by a counter in the circuit LPRS. When the count reaches the displacement value sent to the LPRS, the circuit LPRS sets the signals LMF and LMR at "L" level, thereby braking a motor LMTR.

Once the focus control instruction is sent from the camera to the lens, the camera controller comprising the computer PRS need not be involved in lens driving until lens driving is completed. When a request from the camera is detected, the content of the counter can be sent to the camera.

When an exposure control instruction is sent from the camera to the lens, a known stepping motor DMTR is driven to drive the diaphragm in accordance with a stopping-down count sent from the camera. The stepping monitor is controlled with an open loop process, and an encoder for monitoring its operation is not required.

An encoder circuit ENCZ is connected to the zoom lens system. The circuit LPRS receives a signal SENCZ from the encoder circuit ENCZ to detect a zoom position. Lens parameters at zoom positions are stored in the control circuit LPRS. When a request is sent from the computer PRS on the camera side, a parameter corresponding to the present zoom position is sent to the camera.

An exposure control photometric sensor SPC receives light from an object through the photographing lens. An output SSPC from the photometric sensor SPC is input to an analog input terminal of the computer PRS. The input analog signal is converted into digital data, and the digital data is processed in accordance with a predetermined program, thereby using the processed data for AE control.

A driver SDR drives a focus detection line sensor unit SNS. When the signal CSDR is set at "H" level, the driver SDR is selected and controlled by the computer PRS using the signals SO and SI and the signal SCLK.

A signal $\phi$SEL supplied from the driver SDR to the sensor unit SNS is a signal SEL from the computer PRS. The signal $\phi$SEL selects one of the outputs from the longitudinal sensor array pair (SNSO1 and SNSO2) and the lateral sensor array pair (SNSI1 and SNSI2). When the signal $\phi$SEL (SEL) goes to "H" level, the longitudinal sensor array pair is selected. After charge accumulation, image signals are serially output from the sensor arrays SNSO1 and then SNSO2 from an output VOUT in synchronism with clock signals $\phi$SH and $\phi$HRS, respectively. When the signal $\phi$SEL (SEL) is set at "L" level, the lateral sensor arrays are selected, and image signals are sequentially output from the lateral sensor arrays SNSI1 and SNSI2 in the order named.

A monitor signal VPO is output from an object brightness monitor sensor located near the longitudinal sensor arrays SNSO1 and SNSO2. A monitor signal VPI is output from a monitor sensor located near the lateral sensor arrays SNSI1 and SNSI2. The potentials of the monitor signals VPO and VPI are increased from the start of signal accumulation, thereby controlling the signal accumulation of the sensor arrays.

Signals $\phi$RES and $\phi$VRS are clock signals for resetting the sensors. Signals $\phi$HRS and $\phi$SH are clock signals for reading the image signals. Signals $\phi$TO and $\phi$TI are clock signals for terminating accumulation.

An output VIDEO from the driver SDR is an image signal obtained by calculating a difference between a dark current output and the image signal VOUT from the sensor unit SNS and amplifying the difference with a gain determined by an object brightness level. The dark current output has an output value of pixels shielded in each sensor array. The driver SDR causes a capacitor to hold its output in response to a signal DSH from the computer PRS and performs differential amplification between the held signal and the image signal. The output VIDEO is connected to the analog input terminal of the computer PRS. The computer PRS converts the analog signals into digital signals, and these digital signals are sequentially stored at predetermined addresses of the RAM. Signals /TINTEO and /TINTEI represent that the horizontal sensor array pair (SNSO1 and SNSO2) and the lateral sensor array pair (SNSI1 and SNSI2) are optimally changed, respectively. The computer PRS executes image signal read access upon reception of the signals /TINTEO and /TINTEI.

A signal BTIME determines a timing of a gain of the image signal amplifier in the driver SDR. When the signal BTIME is set at "H" level, the driver SDR determines the gain of the amplifier in accordance with the voltage of the signal VPO or VPI.

Clock signals CK1 and CK2 are used to generate the signals $\phi$RES, $\phi$VRS, $\phi$HRS, and $\phi$SH.

The computer PRS sets the signal CSDR to "H" level and outputs a predetermined "accumulation start command" to the driver SDR, thereby starting the accumulation operation of the sensor unit SNS.

The longitudinal and lateral sensors perform photoelectric conversion of object images, and the charge is accumulated in the sensor photoelectric transducer elements. At the same time, the outputs VPO and VPI from the longitudinal and lateral brightness monitor sensors are increased. When these output potentials reach predetermined levels, the signals /TINTEO and /TINTEI in the driver SDR are independently set at "L" level.

The computer PRS assigns a predetermined waveform to the clock signal CK2. The driver SDR outputs the clock signals $\phi$SH and $\phi$HRS to the sensor unit SNS on the basis of the clock signal CK2. The sensor unit SNS outputs an image signal in response to the clock signal. The computer PRS causes the A/D conversion function to convert the output VIDEO input to the analog input terminal into a digital signal in synchronism with the clock signal CK2 output from the computer PRS. The resultant digital signals are sequentially stored at predetermined addresses of the RAM.

Figure 3B:
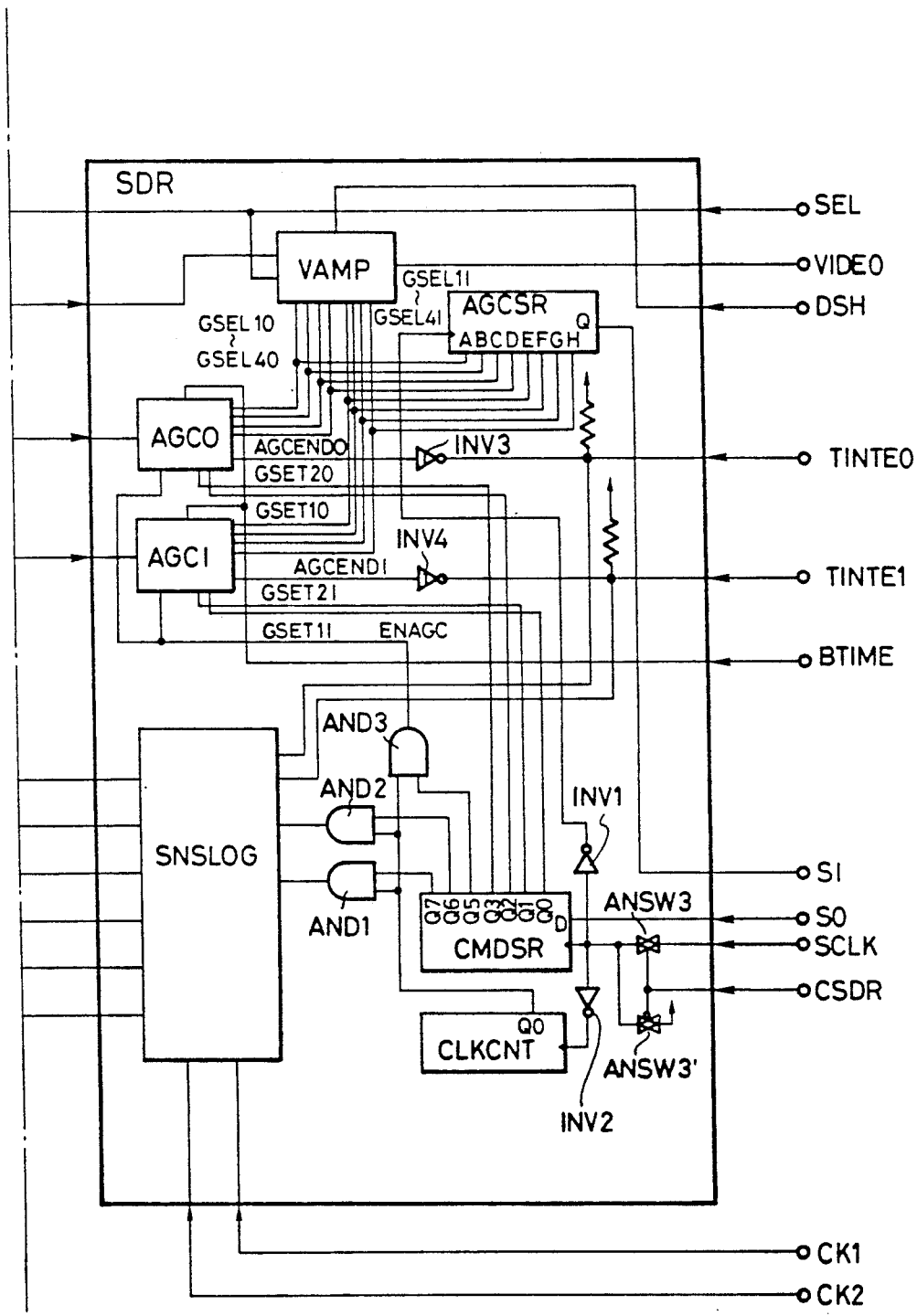

Of the circuit components described above, detailed arrangements of the sensor unit SNS and the sensor driver SDR which are particularly associated with the present invention will be described with reference to FIG. 3.

A pair of longitudinal image signal detection sensor arrays SNSPXO1 and SNSPXO2 and a pair of lateral image signal detection sensor arrays SNSPXI1 and SNSPXI2 are arranged in the sensor unit SNS. The sensor arrays SNSPXO1 and SNSPXO2 and the sensor arrays SNSPXI1 and SNSPXI2 correspond to the sensor arrays SNSO1 and SNSO2 and the sensor arrays SNSI1 and SNSI2, respectively. Circuits DRCKTO1, DRCKTO2, DRCKTI1, and DRCKTI2 perform control and read operations of the respective sensor arrays. Shift registers SNSSRO1, SNSSRO2, SNSSRI1, and SNSSRI2 sequentially output charge signals accumulated in the pixels of the sensor arrays. A pair of sensor arrays AGCPXO1 and AGCPXO2 monitor an object brightness level in the longitudinal direction, and a pair of sensor arrays AGCPXI1 and AGCPXI2 monitor an object brightness level in the lateral direction. These sensor array pairs are located near and parallel to the image signal detection sensor arrays in point symmetry. Circuits AGCCKTO1, AGCCKTO2, AGCCKTI1, and AGCCKTI2 read charge signals from the monitor sensor arrays, respectively.

The arrangement and operation of the sensor unit will be described in more detail with reference to FIG. 4.

The sensor array of this embodiment is constituted by an accumulation type photoelectric transducer element array comprising of a phototransistor array disclosed in Japanese Patent Laid-Open Nos. 60-12579 and 60-12765.

The photoelectric transducer element is different from a known CCD or MOS sensor. A charge proportional to incident light is accumulated in a base portion. A signal corresponding to the accumulated charge amount is output in units of elements. The operation of the photoelectric transducer element is disclosed in the above prior arts, and a detailed description thereof will be omitted.

Figure 4:
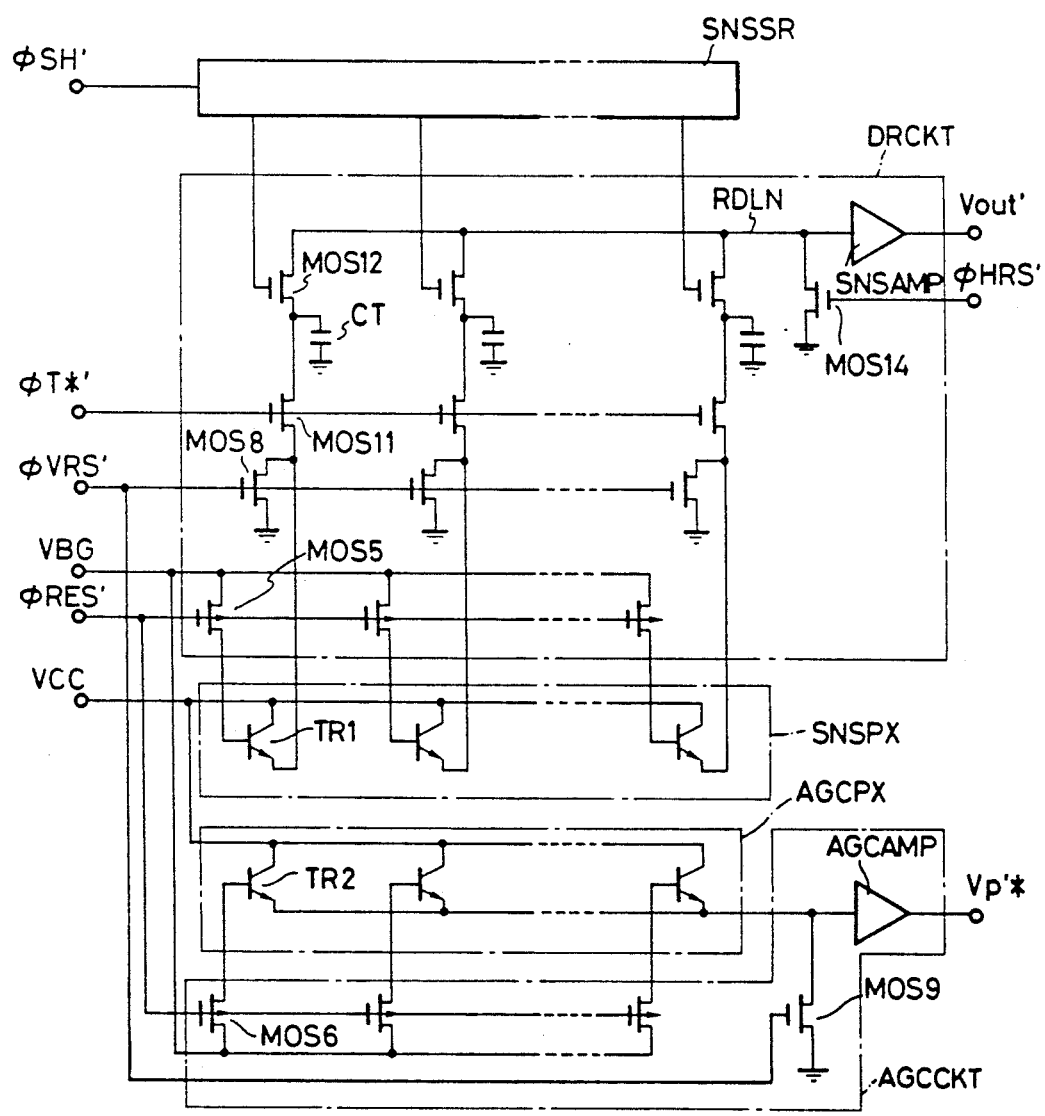
FIG. 4 is a circuit diagram showing an arrangement of a sensor shown in FIG. 3.

Referring to FIG. 4, the gates of p-channel MOS transistors MOS5 connected to the bases of bipolar transistors TR1 serving as photoelectric transducer elements MOS5 are commonly connected and receive a sensor reset clock signal $\phi$RES'. The sources of the MOS transistors MOS5 are commonly connected and receive a constant potential VBG.

The gates of MOS transistors MOS8 connected to the emitters of the transistors TR1 are commonly connected and receive a reset clock signal $\phi$VRS'. The emitters of the transistors TR1 are connected to capacitors CT through MOS transistors MOS11, respectively.

The charges of the capacitors CT are input to an output amplifier SNSAMP through MOS transistors MOS12.

The transistors MOS12 are sequentially turned on by a shift register SNSSR. The shift register SNSSR is arranged such that a signal terminal of "H" level is sequentially shifted in response to read clock signal $\phi$SH'.

The gates of the transistors MOS11 are commonly connected and receive an accumulation end clock $\phi$T*' (where * represents O or I; if * is I, then it corresponds to the longitudinal sensor arrays; however if * is O, then it corresponds to the lateral sensor arrays). The input of the output amplifier SNSAMP is connected to GND through a MOS transistor MOS14. A read clock signal $\phi$HRS' is input to the gate of the transistor MOS14.

The gates of p-channel MOS transistors MOS6 connected to the bases of the bipolar transistors TR2 serving as photoelectric transducer elements are commonly connected and receive the sensor reset clock signal $\phi$RES' in the same manner as in the transistors MOS5. The sources of the MOS transistors MOS6 are commonly connected and receive the constant voltage VBG.

The emitters of the transistors TR2 are commonly connected and a common output signal therefrom is input to an output amplifier AGCAMP.

The input of the output amplifier AGCAMP is connected to GND through a MOS transistor MOS9.

A block SNSPX represented by an alternate long and short dashed line is an image signal detection sensor array constituted by the plurality of bipolar transistors TR1 serving as photoelectric transducer elements. A block DRCKT is a control and read circuit for the sensor array SNSPX and comprises the plurality of MOS transistors MOS5, the plurality of MOS transistors MOS11, the plurality of MOS transistors MOS12, and the plurality of capacitors CT, the output amplifier SNSAMP, and the MOS transistor MOS14.

A block AGCPX represented by an alternate long and short dashed line is a brightness monitor sensor array constituted by the plurality of bipolar transistors TR2. A block AGCCKT is a read circuit for the sensor array AGCPX and comprises the plurality of MOS transistors MOS6, the output amplifier AGCAMP, and the MOS transistor MOS9.

An operation of the sensor array will be described with reference to a timing chart in FIG. 5A.

The signals SCLK, SO, CK1, CK2, and BTIME are control signals input from the computer PRS to the driver SDR. The signals $\phi$RES, $\phi$VRS, $\phi$TO, $\phi$TI, $\phi$SH, and $\phi$HRS are clock signals input from the driver SDR to the sensor unit SNS.

The clock signal serves as the signal $\phi$RES' in FIG. 4; $\phi$VRS, as $\phi$VRS'; $\phi$SH, as $\phi$SH'; and $\phi$HRS, as $\phi$HRS'.

The clock signals $\phi$TO and $\phi$TI are accumulation end clock signals for the longitudinal and lateral sensor arrays and are independently supplied to the sensor arrays. Referring to FIG. 4, the signal $\phi$TO serves as $\phi$T*' for the longitudinal sensor array, while the signal $\phi$TO serves as $\phi$T*' for the lateral sensor array.

The signals $\phi$VRS and $\phi$TO ($\phi$TI) are set at "H" level at time t1, and the signal $\phi$RES is set at "L" level at time t2. All the p-channel MOS transistors MOS5 are turned on, and the potential VBG is applied to the bases of all the transistors TR1. When each of the residual potentials of the bases of the transistors TR1 is lower than the potential VBG, changes are injected into the bases. Otherwise, an excessive charge is recombined. Finally, the charge having the potential VBG is held in each base.

Meanwhile, since the signal $\phi$TO ($\phi$TI) is kept at "H" level, the charges in the capacitors CT are cleared through the MOS transistors MOS8.

When the signal $\phi$RES is set at "H" level at time t3, the charges held in the bases are gradually recombined and disappear since the signal $\phi$VRS is held at "H" level. Since the charge having the base potential as VBG is held at the base of each transistor TR1, the charges left in the bases of the transistors TR1 are equal to each other at time t4 regardless of the magnitudes of the charges held prior to time t2.

When the signals $\phi$VRS and $\phi$TO ($\phi$TI) go to "L" level at time t4, the transistors MOS8 and MOS11 are turned off. From this moment, the charges generated by light pumping or excitation are accumulated by the bases of the transistors. A time interval from time t1 to time t4 is a reset operation period of the sensor unit.

When a predetermined accumulation time has elapsed, the transistors MOS11 are turned on during a period corresponding to a pulse width of the pulse $\phi$TO ($\phi$TI) from time t6 to time t7. Signals corresponding to the charges accumulated by the bases of the transistors TR1 are shifted to the capacitors CT by the transistor operations. Therefore, the bases of the transistors TR1 continuously accumulate optically excited charges without a decrease in charge accumulated in the bases.

When the signal $\phi$HRS is set at "H" level during a time interval from time t8 to time t9, the transistors MOS14 are kept on during this time interval to remove the charges left in the stray capacitances of a read line RDLN to the ground GND. Scanning of the MOS transistors MOS12 is started by the shift register SNSSR operated in response to a pulse the signal $\phi$SH during a time interval from time t10 to time t11. When the transistors MOS12 are turned on, the signals held by the capacitors CT are output to a terminal VOUT' through the read line RDLN and the output amplifier SNSAMP. By repeating the above operations, the signals photoelectrically converted during the accumulation period from time t4 to time t6 can be sequentially read.

In this manner, when the read operation of the signals from all the transistors TR1 is completed, the reset operation is performed again from time t1 to time t4, thereby starting the next accumulation operation.

The operation of the image signal detection sensor array has been described. The reset operation of the object brightness monitor sensor array from time t1 to time t4 is also performed.

During the accumulation after the end of the reset operation, the base potential of each transistor TR2 is gradually increased. The emitter potential of each transistor TR2 is gradually increased accordingly.

Since the emitters of the transistors TR2 are commonly connected, the highest one of the emitter potentials of the transistors TR2 serves as the emitter potential of all the transistors TR2. This highest potential is output to a terminal corresponding to a signal VP*' through the output amplifier AGCAMP. Therefore, the signal VP*' is a time variable signal having a highest brightness level within the object image incident on the object brightness monitor sensor array.

Until the operation is performed, the transistors RT1 continue the charge accumulation. The read operation from time t7 is performed again to extract the photoelectric converted signals from the last reset operation up to the present. This operation timing is shown in FIG. 5B.

Figure 5B:
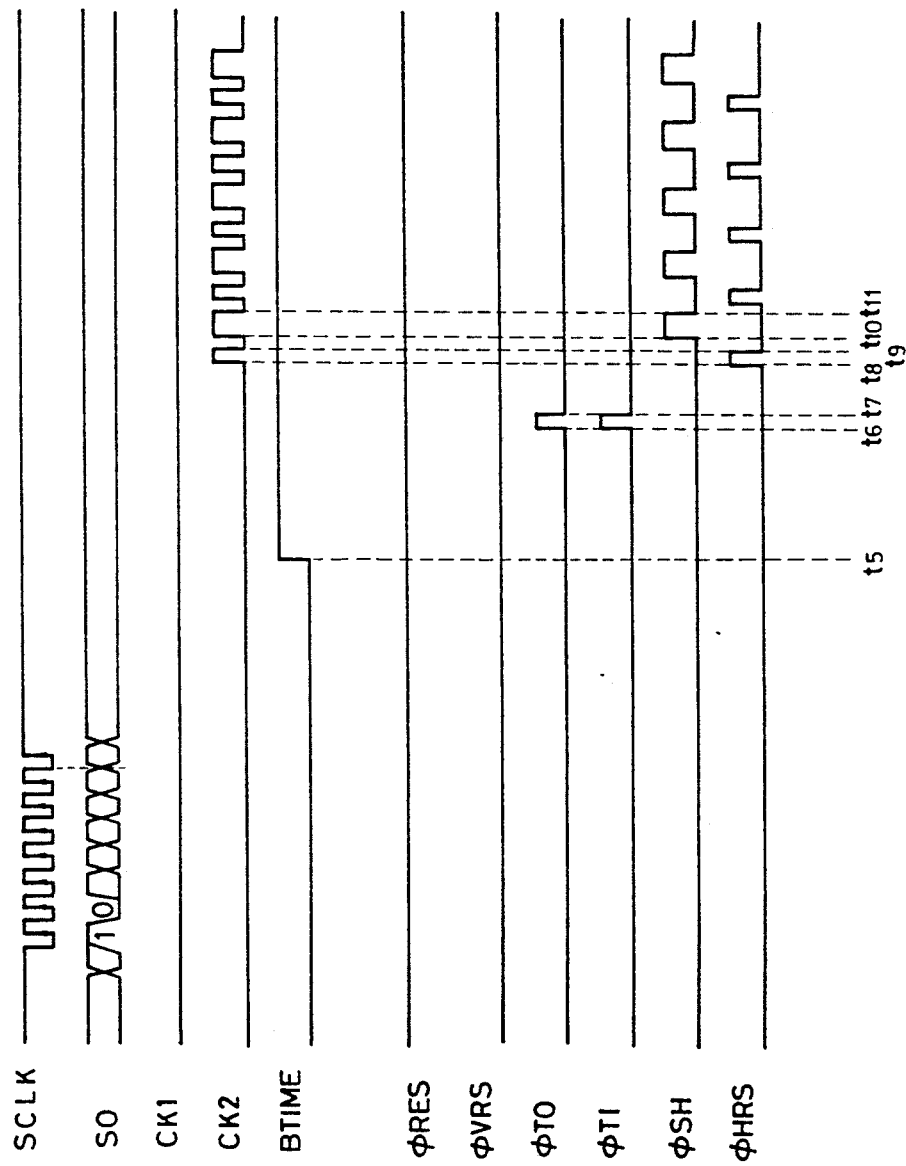

Referring to FIG. 5B, the reset operation is not performed from time t1 to time t4, as described above. During this time interval, only the read operation is performed. This operation is called "not destruction accumulation" or "not destruction read access". This mode of operation is one of the main features of this embodiment.

A further description will be made with reference to FIG. 3 again.

The sensor arrays described with reference to FIG. 4 comprise two longitudinal sensor arrays and two lateral sensor arrays. The outputs from the longitudinal sensor arrays (SNSPXO1 and SNSPXO2) are coupled as VoutO which is then input to an analog switch ANSW1. Similarly, the outputs from the lateral sensor arrays (SNSPXI1 and SNSPXI2) are coupled as VoutI which is then input to an analog switch ANSW1'. In practice, the output amplifier ANSAMP is omitted from the read circuit DRCKTO2 of the sensor array SNSPXO2. The read line RDLN of the read circuit DRCKTO2 is connected as VoutO2 to the read line of the read circuit DRCKTO1 of the sensor array SNSPXO1. The output from the output amplifier of the circuit DRCKTO1 serves as VoutO. The arrangement of the lateral sensor array is the same as that of the vertical sensor array.

Outputs from the analog switch pair (ANSW1 and ANSW1') are wired to obtain an output Vout which is defined as an image signal output. A control signal for the switch pair is $\phi$SEL. When the signal $\phi$SEL is set at "H" level, the switch ANSW1 is turned on. When the signal $\phi$SEL is set at "L" level, the switch ANSW1' is turned on. Therefore, when the signal $\phi$SEL is set at "H" level, a horizontal sensor array image signal VoutO is output as Vout. When the signal $\phi$SEL is set at "L" level, the lateral sensor array image signal VoutI is output as Vout.

The outputs (VPO1 and VPO2) from the vertical object brightness monitor sensor array pair (AGCPXO1 and AGCPXO2) are input to an amplifier AGCOAMP through a resistor to constitute an illustrated circuit arrangement. The output VPO from the circuit arrangement is a sum of the outputs VPO1 and VPO2.

The output VPI from an amplifier AGCIAMP is a sum of the outputs (VPI1 and VPI2) of the lateral monitor sensor array pair.

Signals $\phi$RES, $\phi$VRS, and $\phi$HRS from the sensor driver SDR are input to the respective read circuits.

The signal $\phi$SH is input to the common input of an analog switch pair (ANSW2 and ANSW2'), and an output from the analog switch ANSW2 is input as the input $\phi$SH' of the longitudinal shift register SNSSRO2 and as the input $\phi$SH' of the lateral shift register SNSSRI2. In addition, since the control signal of the switch pair is $\phi$SEL, the analog switch ANSW2 is turned on in response to the signal $\phi$SEL of "H" level. The signal $\phi$SH is input to only the longitudinal shift register. When the signal $\phi$SEL is set at "L" level, only the analog switch ANSW2' is turned on, so that the signal $\phi$SH is input to the lateral shift register. A signal from the last stage of the shift register SNSSRO2 is input as the input $\phi$SH' of the longitudinal shift register SNSSRO1. When scanning of the shift register SNSSRO2 is completed, scanning of the shift register SNSSRO1 is performed. The lateral shift register is operated in the same manner described above.

The signal φTO serves as the input φT*' of the longitudinal read circuits (DRCKTO1 and DRCKTO2). The signal φTI serves as the input φT*' of the lateral read circuits (DRCKTI1 and DRCKTI2).

The sensor driver SDR will be described below.

A clock generation logic circuit SNSLOG outputs the signals φRES and φVRS during resetting of the sensor and the signals φHRS and φSH during read access of the sensor on the basis of the clock signals CK1 and CK2 input from the computer PRS.

Accumulation control circuits AGCO and AGCI control the longitudinal and lateral sensor arrays, respectively, and will be described below with reference to FIG. 6.

Figure 6:
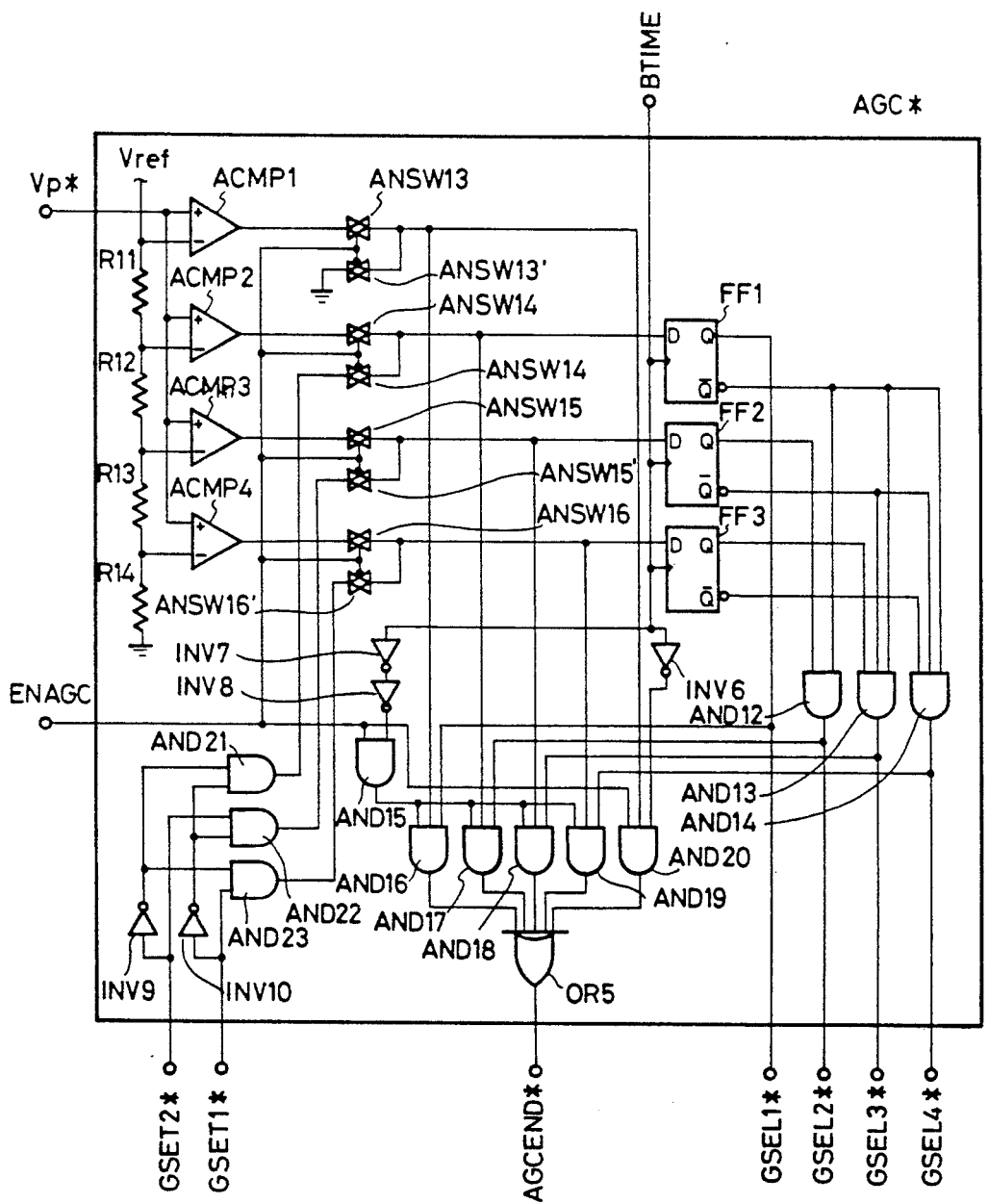
FIG. 6 is a circuit diagram showing an arrangement of an accumulation control circuit AGC shown in FIG. 3.

Referring to FIG. 6, the brightness monitor sensor signal VPO or VPI from the sensor unit SNS is input to a terminal corresponding to a monitor signal VP* and is connected to the positive inputs of comparators ACMP1, ACMP2, CMP3, and ACMP4. Potentials obtained by dividing a voltage Vref by resistors are input to the negative inputs of the comparators. The resistances of resistors R11, R12, R13, and R14 are set to satisfy the following relation:

R11:R12:R13:R14=4:2:1:1

Therefore, the voltage Vref is input to the negative input of the comparator ACMP1; Vref/2, comparator ACMP2; Vref/4, ACMP3; and Vref/8, ACMP4.

All outputs from the comparators are set at "L" level during sensor resetting. When the potential of the monitor signal VP* is increased as a function of time, the outputs from the comparators ACMP4, ACMP3, ACMP2, and ACMP1 sequentially go high in the order named.

When a signal ENAGC is set at "H" level, of all analog switch pairs (ANSWI3 and ANSWI3'), (ANSWI4 and ANSWI4'), (ANSWI5 and ANSWI5'), (ANSWI6 and ANSWI6'), the analog switches ANSWI3, ANSWI4, ANSWI5, and ANSWI6 are turned on. Outputs from the respective comparators are input to AND gates AND16, AND17, AND18, AND19, and AND20. The signal ENAGC is a selection signal for determining whether sensor accumulation control is performed by the monitor signal. When the signal ENAGC is set at "H" level, accumulation control by the monitor signal is performed.

The signal ENAGC will be described in detail later.

Of all the outputs from the comparators, outputs from the comparators ACMP2, ACMP3, and ACMP4 are respectively input to the D inputs of D flip-flops FF1, FF2, and FF3. The clock inputs of the flip-flops FF1, FF2, and FF3 receive the signal BTIME. Therefore, the flip-flops FF1, FF2, and FF3 hold the output states of the comparators ACMP2, ACMP3, and ACMP4 when the signal BTIME is set at "H" level.

The signal BTIME is a signal for giving a timing to determine the gain of image signal amplification and is output from the computer PRS.

The gain determination and accumulation control in this embodiment will be described with reference to FIG. 7.

Figure 7:
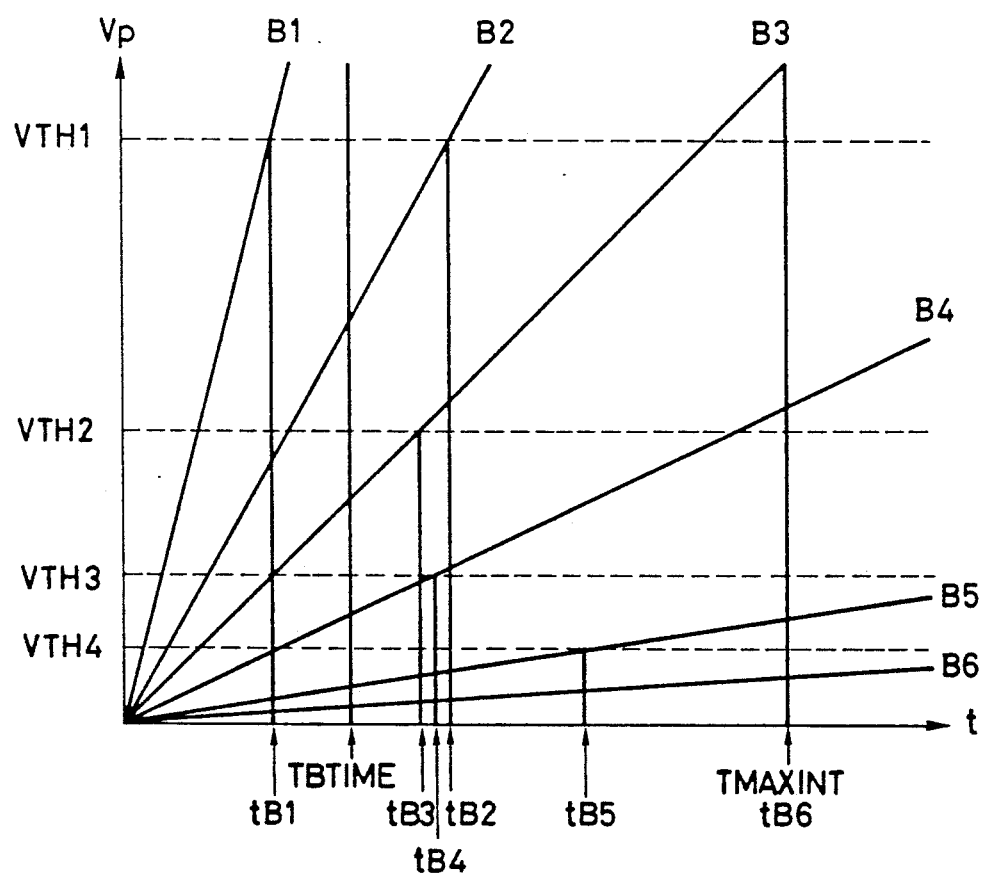
FIG. 7 is a waveform chart for explaining a method of controlling accumulation by the circuit AGC shown in FIG. 6.

Referring to FIG. 7, the time from the start of accumulation is plotted along the abscissa. TBTIME along the abscissa represents time when the signal BTIME is set at "H" level, and TMAXINT along the abscissa represents a maximum accumulation time. When a brightness level of an object is low, the magnitude of the image signal can be increased in a prolonged accumulation time. However, when the accumulation time is prolonged in an accumulation type sensor, sensor noise called a dark current is increased. Even if the object brightness level is extremely low, the accumulation time cannot be infinitely prolonged, and the accumulation time is appropriately interrupted according to a general control technique. This time is called the maximum accumulation time.

The potential of the monitor signal VP* is plotted along the ordinate. VTH1, VTH2, VTH3, and VTH4 along the ordinate represent potentials input to the negative inputs of the comparators ACMP1, ACMP2, ACMP3, and ACMP4, respectively.

As described above, the magnitude of the signal VP* is increased as a function of time. The rate of increase in magnitude of the signal VP* is increased when the object brightness level is increased, as indicated by a curve B1. Otherwise, the rate of increase is given by a curve B6.

There are six combinations of the gains and accumulation control for the monitor signal VP* as follows:

(1) The potential VP* is higher than VTH1 prior to time TBTIME (curve B1).

Accumulation is ended at time tB1 for VP*=VTH1, and a gain is 1.

(2) Inequality VTH2≦VP*<VTH1 is established at time TBTIME (curve B2).

Accumulation is ended at time tB2 for VP*=VTH1, and a gain is 1.

(3) Inequality VTH3≦VP*<VTH2 is established at time TBTIME (curve B3).

Accumulation is ended at time tB3 for VP*=VTH2, and a gain is 2.

(4) Inequality VTH4≦VP*<VTH3 is established at time TBTIME (curve B4).

Accumulation is ended at time tB4 for VP*=VTH3, and a gain is 4.

(5) Inequality 0≦VP*<VTH4 is established at time TBTIME, and VP* exceeds VTH4 prior to TMAXINT (curve B5).

Accumulation is ended at time tB5 for VP*=VTH4, and a gain is 8.

(6) Inequality 0≦VP*<VTH4 is established at time TBTIME, and VP* does not exceed VTH4 at time TMAXINT (curve B6).

Accumulation is ended at time TMAXINT (tB6), and a gain is 8.

When a ratio of comparison potentials VTH1, VTH2, VTH3, and VTH4 for the potential VP* is set to be 8:4:2:1 and the gains of the image signals obtained when the potential VP* reaches the comparison potentials are set to be 1, 2, 4, and 8, the magnitudes of the amplified image signals can always be equal to each other regardless of the end timing of accumulation at any one of the comparison potentials. The signal BTIME is a signal for giving time for determining this gain. When the signal TBTIME is generated earlier, a higher gain can be obtained even if the object brightness is kept unchanged.

When a high gain can be obtained, the accumulation time can be shortened to improve the response characteristics of focus detection. However, the noise component included in the image signal is also amplified with a high gain, thus decreasing an S/N ratio.

The time TBTIME is appropriately determined in consideration of the response time and the S/N ratio.

A description of a accumulation control circuit AGC* in FIG. 6 will be made again.

Q and $\overline{Q}$ outputs from the flip-flops FF1, FF2, and FF3 are output directly or through AND gates AND12, AND13, and AND14 to obtain signals GSEL1*, GSEL2*, GSEL3*, and GSEL4*. These signals represent that the gains are set to be 1, 2, 4, and 8. That is, when the output from the flip-flop is confirmed at the leading edge of the signal BTIME at time TBTIME and if the Q output from the flip-flop FF1 is set at "H" level, the monitor signal VP* has a potential higher than the potential VTH2 at time TBTIME. Similarly, if the Q output from the flip-flop FF2 is set at "H" level, the signal VP* has a potential higher than the potential VTH3. If the Q output from the flip-flop FF3 is set at "H" level, the signal VP* has a potential higher than the VTH4. The signal GSEL1" is the Q output from the flip-flop FF1. The signal GSEL2* is an AND signal of the $\overline{Q}$ output from the flip-flop FF1 and the Q output from the flip-flop FF2. The signal GSEL3* is an AND signal of the $\overline{Q}$ outputs from the flip-flops FF1 and FF2 and the Q output from the FF3. The signal GSEL4* is an AND signal of the $\overline{Q}$ outputs from the flip-flops FF1, FF2, and FF3. When the monitor signal VP* has a potential higher than the VTH2 at time TBTIME, only the signal GSEL1* is set at "H" level, and the gain is 1. Similarly, when the signal VP* is higher than VTH3 and lower than VTH2, only the signal GSEL2* is set at "H" level, and the gain is 2. When the signal VP* is higher than VTH4 and lower than VTH3, only the signal GSEL3* is set at "H" level, and the gain is 4. When the signal VP* does not exceed VTH4 at time BTIME, only the GSEL4* is set at "H" level, and the gain is 8.

The accumulation end operation will be described below.

The signals GSEL1*, GSEL2*, GSEL3*, and GSEL4* are output outside the circuit AGC* and at the same time are input to the AND gates AND16, AND17, AND18, and AND19. These AND gates commonly receive an output from an AND gate AND15. The gates of the AND gates AND16, AND17, AND18, and AND19 receive outputs from the comparators ACMP1, ACMP2, ACMP3, and ACMP4 through the analog switch pairs (ANSWI3 and ANSWI3'), (ANSWI4 and ANSWI4'), (ANSWI5 and ANSWI5'), and (ANSWI6 and ANSWI6'). When the signal ENAGC is set at "H" level, the output from the comparator ACMP1 is input to the AND gates AND16 and AND20. Similarly, the output from the comparator ACMP2 is input to the AND gate AND17, the output from the comparator ACMP3 is input to the AND gate AND18, and the output from the comparator ACMP4 is input to the AND gate AND19.

The AND gate AND 15 receives the signal ENAGC and the signal BTIME through inverters INV7 and IV8.

Direct coupling of the inverters IV7 and INV8 aims at delaying the signal BTIME. The signal BTIME is input to the AND gates AND16 to AND20 after the outputs from the flip-flops FF1 to FF3 are confirmed and input to the AND gates AND16 to AND20. When the signal BTIME goes from "L" level to "H" level while the signal ENAGC is set at "H" level, an output from the AND gate AND15 is changed from "L" to "H" with a slight delay. This signal is input to the AND gates AND16 to AND19.

The AND gate AND20 also receives a signal obtained by inverting the signal BTIME by an inverter INV6.

Outputs from the AND gates AND16 to AND20 are input to an OR gate OR5. An output from the OR gate OR5 is output as a signal AGCEND* outside the circuit AGC*.

An operation in a brightness state (curve B1) shown in FIG. 7 will be described below. Until time tB1, the outputs from the comparators ACMP4, ACMP3, and CMP2 are sequentially changed from "L" to "H", but the signal BTIME is kept at "L" level. In this state, the AND gate AND15 is kept at "L" level. Therefore, the AND gates AND16 to AND20 are kept "L". When the monitor signal VP* reaches the potential VTH1 at time tB1, the output from the comparator ACMP1 goes from "L" to "H". One of the three inputs of the AND gate AND20 receives an inverted signal of the signal BTIME, i.e., "H" level signal. In response to the logical change from "L" to "H" of the comparator ACMP1, an output from the AND gate AND20 goes from "L" to "H". The output AGCEND* from the OR gate OR5 goes from "L" to "H". At this moment, charge accumulation of the sensor is optimized. As will be described later, the signal AGCEND* is input to the clock generator SNSLOG (FIG. 3) through inverters INV3 and IV4. The clock generators SNSLOG generates the signal $\phi$TO (or $\phi$TI) shown in FIG. 5A in response to the signal AGCEND*. A signal corresponding to the accumulated charge in the sensor is charged by the capacitors CT. From this moment, the image signals of the sensor can be read.

A signal inverted through the inverter INV3 or INV4 is input to the clock generator SNSLOG and is output as the external signal /TINTEO or /TINTEI outside the sensor driver SDR. The signals /TINTEO and /TINTEI are stored in the computer PRS. Therefore, when signal AGCENDO (or AGCENDI) is inverted from "L" level, its inverted signal /TINTEO (or /TINTEI) goes "L", thereby informing the computer PRS of the accumulation end timing.

An operation for the curve B2 in FIG. 7 will be described below. The sequence until time TBTIME is the same as in the curve B1. That is, outputs from the comparators are sequentially inverted from "L" level to "H" level, but the monitor signal VP* does not reach the potential VTH1, and the accumulation is not ended.

When the signal BTIME goes from "L" level to "H" level, the outputs from the comparators ACMP4, ACMP3, and ACMP2 have already been "H" level, the Q outputs from the flip-flops FF1, FF2, and FF3 are latched to "H" level. Therefore, the signal GSEL1* is set at "H" level, and the signals GSEL2*, GSEL3*, and GSEL4* are set at "L" level, so that the gain is set to 1. In addition, the AND gate AND15 is set from "L" level to "H" level with a slight delay by the delay behavior of the inverters IV7 and INV8 after time TBTIME at which the signal BTIME is changed from "L" level to "H" level. Of the AND gates AND16 to AND19, two out of three inputs of only the AND gate AND16 are set at "H" level. In this case, one out of three inputs of each of the remaining AND gates AND17 to AND19 is set at "H" level.

An output from the comparator ACMP1 is changed from "L" level to "H" level at time tB2 and is input to the AND gate AND16. An output from the AND gate AND16 is changed from "L" level to "H" level. An output from the OR gate OR5 is changed from "L" level to "H" level. At this moment, accumulation of the sensor is completed.

An operation for the curve B3 will be described below. A gain of 2 is confirmed at time TBTIME, and only the signal GSEL2* is set at "H" level. The AND gate AND15 is set at "H" level with a slight delay from time TBTIME. Two out of three inputs of the AND gate AND15 are set at "H" level. The remaining one input is an output from the comparator ACMP2. When the monitor signal VP* reaches the potential VTH2 at time tB3, the output from the comparator CAMP2 is changed from "L" level to "H" level, and the output from the AND gate AND17 is set at "H" level. In the same manner as in the curve B2, the OR gate OR5 is changed from "L" level to "H" level. At this moment, the accumulation operation is ended.

In operations for the curves B4 and B5, the accumulation operations are ended at times tB4 and tB5 with gains of 4 and 8, respectively.

An operation for the curve B6 in FIG. 7 is different from those for the curves B1 to B5. Since the monitor signal VP* does not reach the potential VTH4 at time TBTIME, the gain is 8. This is the same as in the curve B5. In this state, when the monitor signal VP* reaches the potential VTH4, the accumulation is ended (tB5 in the curve B5). Even if the maximum accumulation time TMAXINT has elapsed, the monitor signal VP* does not reach the potential VTH4 in the curve B6. At this moment, the accumulation is forcibly interrupted based on the limitation of the maximum accumulation time as previously described. More specifically, the computer PRS forcibly sets the signal /TINTE* at "L" level in FIG. 3. Since the inverters INV3 and INV4 are open collector type inverters, their outputs are pulled up inside the inverters. The signal /TINTEO or /TINTEI goes to "L" level in response to an external pulse, so that the clock generator SNSLOG outputs the clock pulse φTO (or φTI), thereby terminating the accumulation operation of the sensor.

The above description has been made on an assumption that the signal ENAGC is set at "H" level. When the signal ENAGC is set at "H" level, "accumulation control of the sensor is performed on the basis of the monitor signal VP* (to be referred to as an "AGC accumulation" mode hereinafter)". When the signal ENAGC is set at "L" level, "accumulation control of the sensor is performed on the basis of the given gain and the accumulation time (to be referred to as a "not AGC accumulation" mode hereinafter)".

When the signal ENAGC goes to "L" level, analog switches ANSWI3', ANSWI4', ANSWI5', and ANSWI6' of the analog switch pairs (ANSWI3 and ANSWI3'), (ANSWI4 and ANSWI4'), (ANSWI5 and ANSWI5'), (ANSWI6 and ANSWI6') are turned on. Instead of the outputs from the comparators ACMP1, ACMP2, ACMP3, and ACMP4, outputs from AND gates AND21 to AND23 are supplied to the flip-flops FF1, FF2, and FF3, and the AND gates AND16 to AND20. The outputs from the AND gates AND21 to AND23 are determined by the external signals GSEL2* and GSEL1* supplied from the circuit AGC*, thereby setting the gains. The correspondence between the signals GSEL1* and GSEL2* and the AND gates AND21 to AND23 is defined, as shown in FIG. 12.

The outputs from the AND gates AND21 to AND23 are supplied to the flip-flops FF1 to FF3 and the AND gates AND16 to AND20 regardless of the logical level of the monitor signal VP*. When the signal BTIME goes from "L" level to "H" level, the flip-flops FF1 to FF3 latch the outputs. At this moment, the gains are determined. After the gains are determined, no changes occur in the inputs to the AND gates AND16 to AND20. The end of accumulation cannot occur logically. As indicated by the curve B6 in FIG. 7, the signal /TINTEO (or /TINTEI) is forcibly changed from "H" level to "L" level in response to an external pulse, thereby terminating the accumulation.

Referring back to FIG. 3, signals GSEL2O, GSEL1O, GSEL2I, and GSEL1I can be set by outputs Q0 to Q3 of a communication command shift register CMDSR. Communication regulations between the sensor driver SDR and the computer PRS will be described below.

Figure 13:
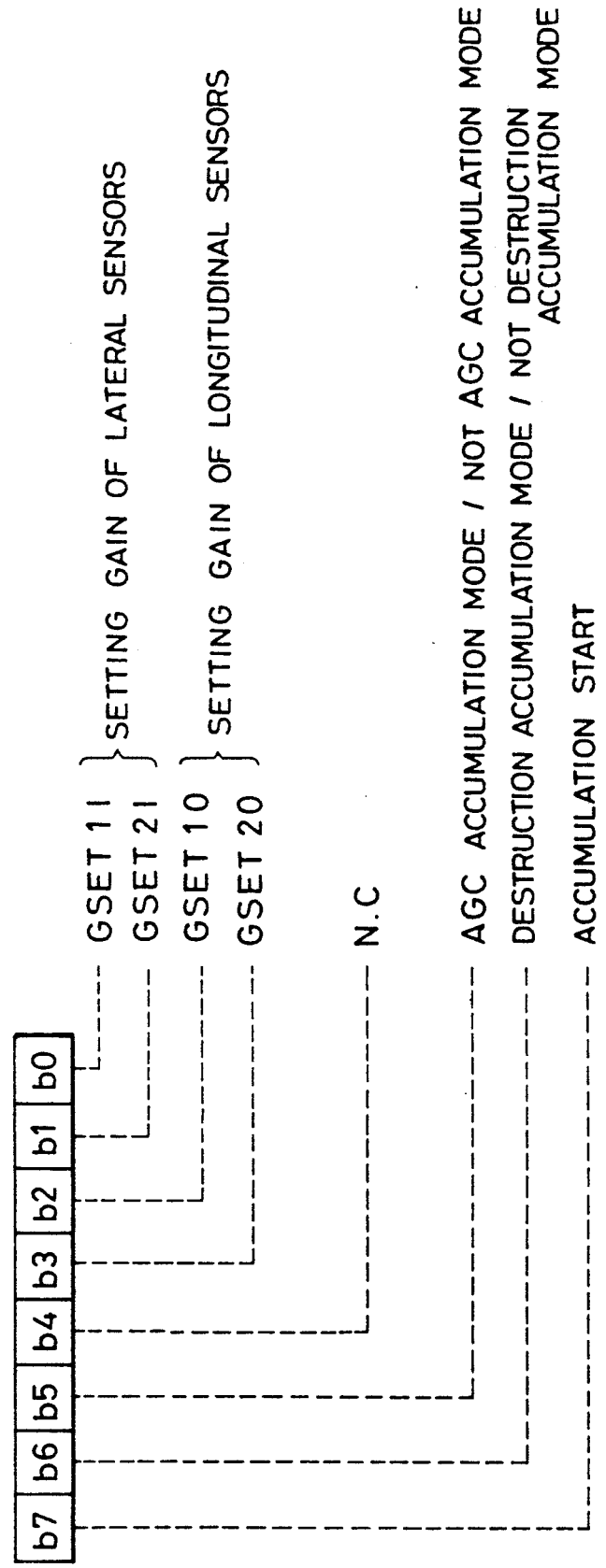

The driver SDR is selected in response to a chip select signal CSDR. When the chip select signal CSDR is set at "H" level, the analog switch ANSW3 is turned on to supply a sync clock signal to the clock input of the command shift register CMDSR. When communication is performed in this state, transmission data from the computer PRS is input to the 8-bit 3-shift register CMDSR as the signal SO in synchronism with the clock signal SCLK. Outputs Q0 to Q7 from the register CMDSR are determined at the end of 8-bit communication. A communication format is shown in FIG. 13.

The outputs Q7, Q6, and Q5 from the register CMDSR are respectively input to AND gates AND1, AND2, and AND3. The output Q0 from a clock counter CLKCNT is commonly input to the clock terminals of the AND gates AND1, AND2, and AND3. The counter CLKCNT is a 3-bit binary counter, and its input receives an inverted signal (i.e., a signal inverted by an inverter INV2) of the communication clock signal CLK. Therefore, the Q0 output is set at "H" level every time 8-bit communication is terminated.

With the above arrangement, the outputs from the AND gates AND1, AND2, and AND3 are determined at the end of 8-bit communication. The output from the AND gate AND1 is an "accumulation start" signal. In response to the accumulation start signal, the clock generator SNSLOG generates the sensor clock signals φRES, φVRS, φTO, and φTI on the basis of the sensor clock signal CK1, as described in FIGS. 5A or 5B.

The output from the AND gate AND2 is a signal for switching between the "destruction accumulation" mode and the "not destruction accumulation" mode. When the output from the AND gate AND2 is set at "H" level, the "destruction accumulation" mode is set to perform accumulation after the sensor is normally reset. The clock generator SNSLOG generates the clock signals shown in FIG. 5A. However, when the output from the AND gate AND2 is set at "L" level, the "not destruction accumulation" mode is set to perform accumulation without resetting the sensor. In this case, the clock generator SNSLOG generates the clock signals shown in FIG. 5B (in this case, no signals are output in practice).

The output from the AND gate AND3 is a signal for switching between the "AGC accumulation" mode and the "not AGC accumulation" mode. This signal serves as the signal ENAGC which is then input to the accumulation control circuits AGCO and AGCI.

An image signal amplifier VAMP will be described with reference to FIG. 8.

Figure 8:
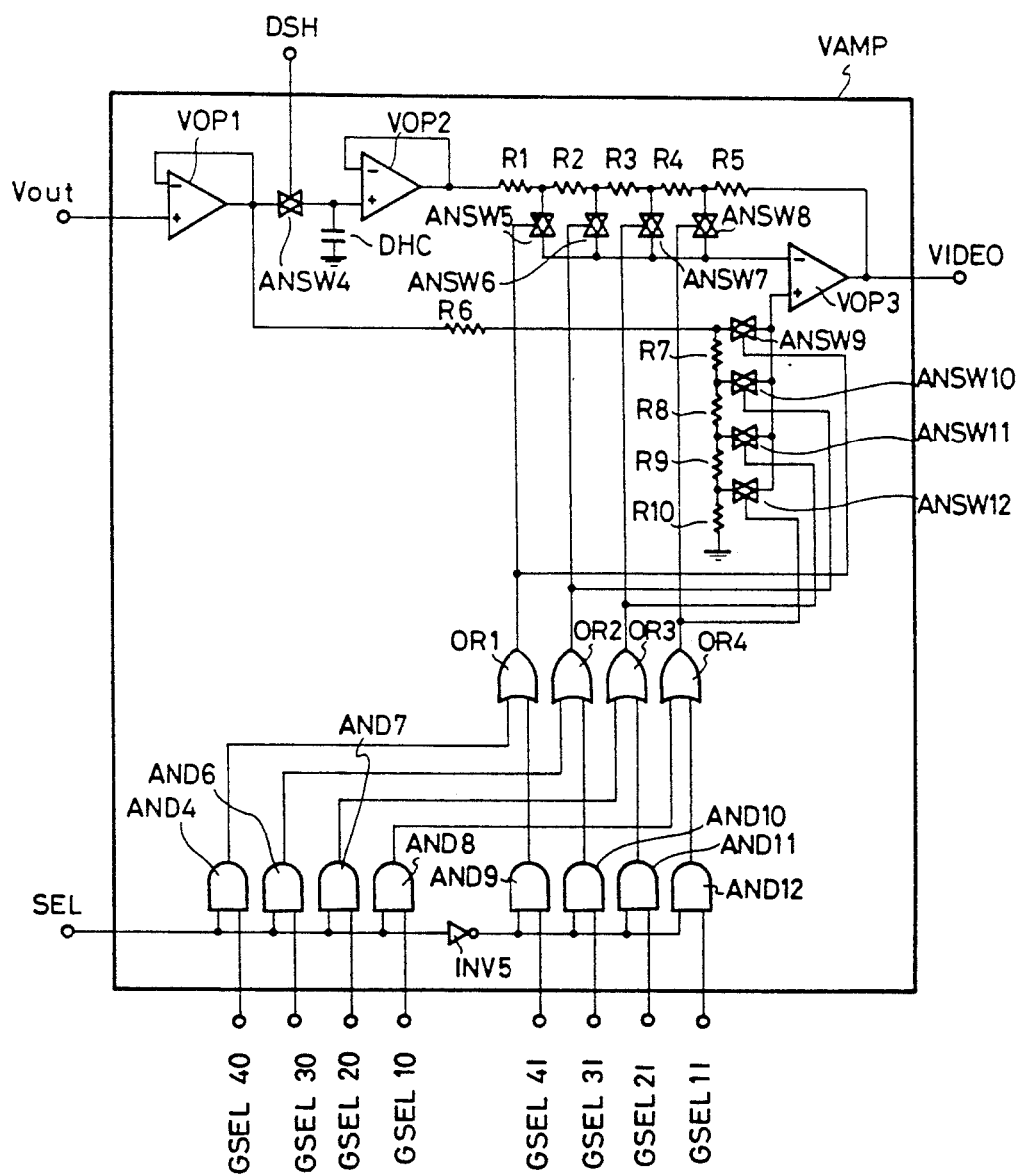
FIG. 8 is a circuit diagram showing an arrangement of an amplifier, VAMP shown in FIG. 3.

Referring to FIG. 8, the image signal Vout output from the sensor is connected to the analog switch ANSW4 and a resistor R6 through a voltage follower VOP1. The analog switch ANSW4, a capacitor DHC, and a voltage follower VOP2 constitute a so-called a sample/hold circuit. The sample/hold circuit performs sampling during the "H" period of a control signal DSH and holds the sampled values during its "L" period. The sample/hold circuit holds the potentials of the shielded pixels of the sensor. The sample/hold circuit holds an image signal of the first pixel (shielded pixel) during read access of the image signal as the signal DSH and a predetermined period "H", differentially calculates the held potentials during read access of valid pixels (to be described later), and then amplifying the difference.

An operational amplifier VOP3, resistors R1 to R10, and analog switches ANSW5 to ANSW12 constitute a variable gain amplifier. Each analog switch is controlled by OR gates OR1 to OR4. Outputs from AND gate pairs (AND4 and AND9), (AND6 and AND10), (AND7 and AND11) and (AND8 and AND12) are input to the OR gates OR1 to OR4, respectively. Gain signals GSEL4O to GSEL1O and GSEL4I to GSEL1I, the signal SEL, and its inverted signal (inverted by an inverter INV5) are commonly input to the AND gates. The signal SEL is a signal for selecting the lateral or longitudinal sensor array. When the signal SEL is set at "H" level, the longitudinal sensor array is selected. However, when the signal SEL is set at "L" level, the lateral sensor array is selected. When the signal SEL is set at "H" level, the signals GSEL4O to GSEL1O are directly input from the AND gates AND4 to AND8. In this case, all outputs from the AND gates AND9 to AND12 are set at "L" level. For example, when the signal GSEL1O is set at "H" level (all the signals GSEL2O to GSEL4O are set at "L" level), only an output from the AND gate AND8 is set at "H" level, and then an output from the OR gate OR4 which receives the output from the AND gate AND8 is set at "H" level. If the signal GSEL2O is set at "H", only the OR gate OR3 is set at "H"; if GSEL3O, then OR2; and if GSEL4O, then OR1. In this case, all the AND gates AND9 to AND12 are set at "L" by the inverter INV5. In this case, an operation is not associated with the gain signals GSEL1I to GSEL4I for the lateral sensor array.

When the signal SEL is set at "L" to select the lateral sensor array, the signals GSEL1I, GSEL2I, GSEL3I, and GSEL4I correspond to the OR gates OR4, OR3, OR2, and OR1, respectively. In this case, all the outputs from the AND gate AND4 to AND8 are set at "L".

The resistors R1 to R10 satisfy the following conditions:

$$R1 = R6, R2 = R7, R3 = R8, R4 = R9, R5 = R10$$

and $$R1:(R2 + R3 + R4 + R5) = 1:8$$

$$(R1 + R2):(R3 + R4 + R5) = 1:4$$

$$(R1 + R2 + R3):(R4 + R5) = 1:2$$

$$(R1 + R2 + R3 + R4):R5 = 1:1$$

that is, $$R2 = 4R1/5$$

$$R3 = 6R1/5$$

$$R4 = 3R1/2$$

$$R5 = 9R1/2$$

With the above arrangement, when only the output from the OR gate OR4 is set at "H" level, the analog switches ANSW8 and ANSW12 are turned on, so that the gain of the operational amplifier VOP3 is 1. When only the output from the OR gate OR3 is set at "H" level, the analog switches ANSW7 and ANSW11 are turned on, and the gain is set to 2. When only the output from the OR gate OR2 is set at "H" level, the analog switches ANSW6 and ANSW10 are turned on, and the gain is set to 4. When only the output from the OR gate OR1 is set at "H" level, the analog switches ANSW5 and ANSW9 are turned on, and the gain is set to 8. The output from the operational amplifier VOP3 is connected to the analog input terminal of the computer PRS as the amplified image signal VIDEO. The computer PRS converts this signal into a digital signal, thereby obtaining an image signal of the sensor.

Referring back to FIG. 3, the longitudinal gain signals GSEL1O to GSEL4O and the lateral gain signals GSEL1I to GSEL4I are output from the accumulation control circuits AGCO and GCI and input to the image signal amplifier VAMP. At the same time, these gain signals are also connected to the parallel inputs of a parallel-in serial-out shift register AGCSR. Since the shift register AGCSR receives an inverted signal (by an inverter INV1) of the communication clock signal, the shift register AGCSR outputs serial data from the Q output in response to parallel input data when communication is started. The serial output data is supplied to the computer PRS as its reception data. The computer PRS can detect the set gains of the sensor unit.

The AF control apparatus of the camera having the above arrangement will be described with reference to flow charts from FIGS. 9A to 9C.

Upon the first half depression of the release button of the camera, the switch SW1 is turned on to start the AF control operation in step (000).

Figure 9A:
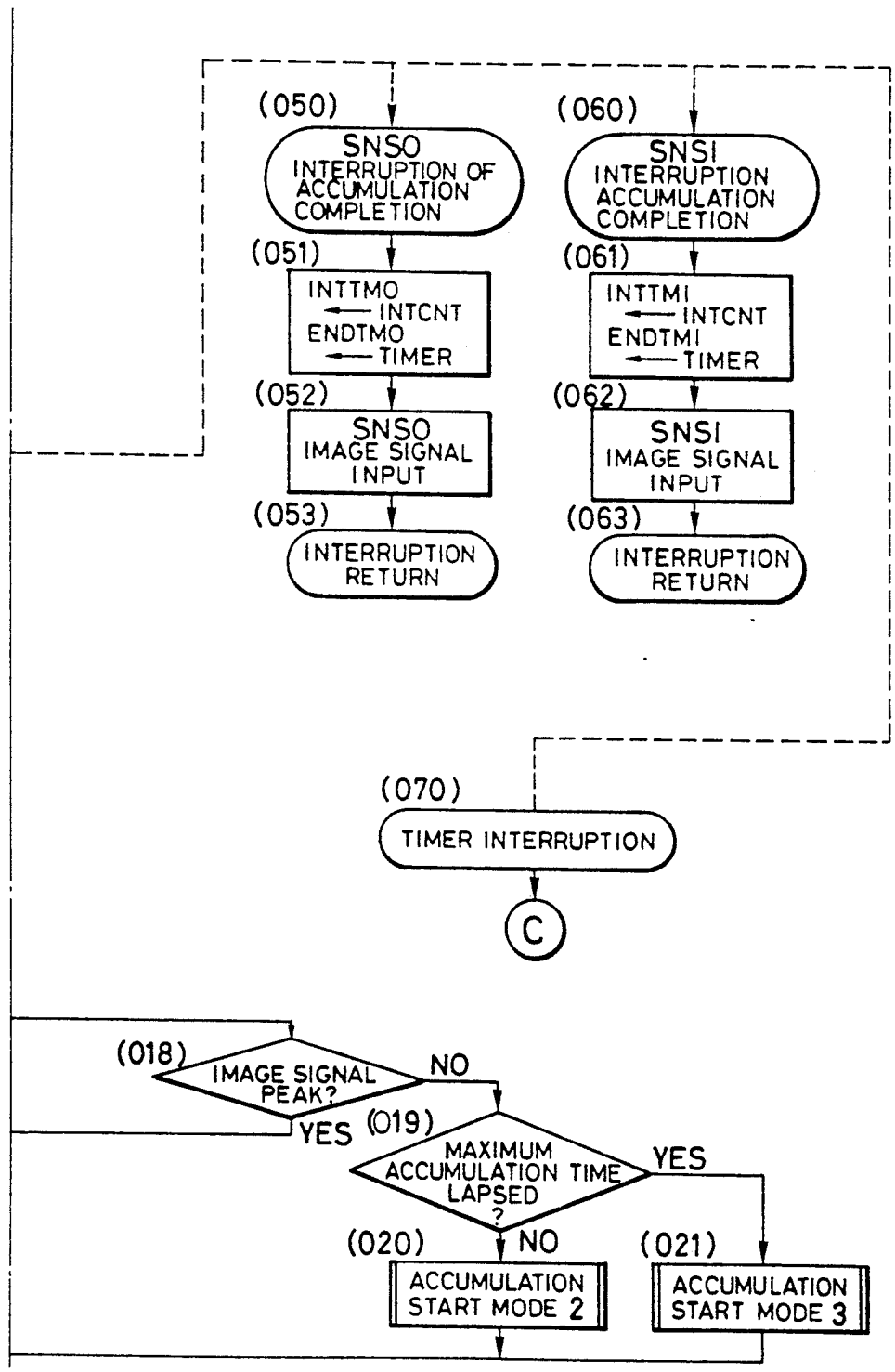
FIGS. 9A, 9A(a), 9A(b), 9B, 9B(a), 9B(b), and 9C.
Figure 9B:
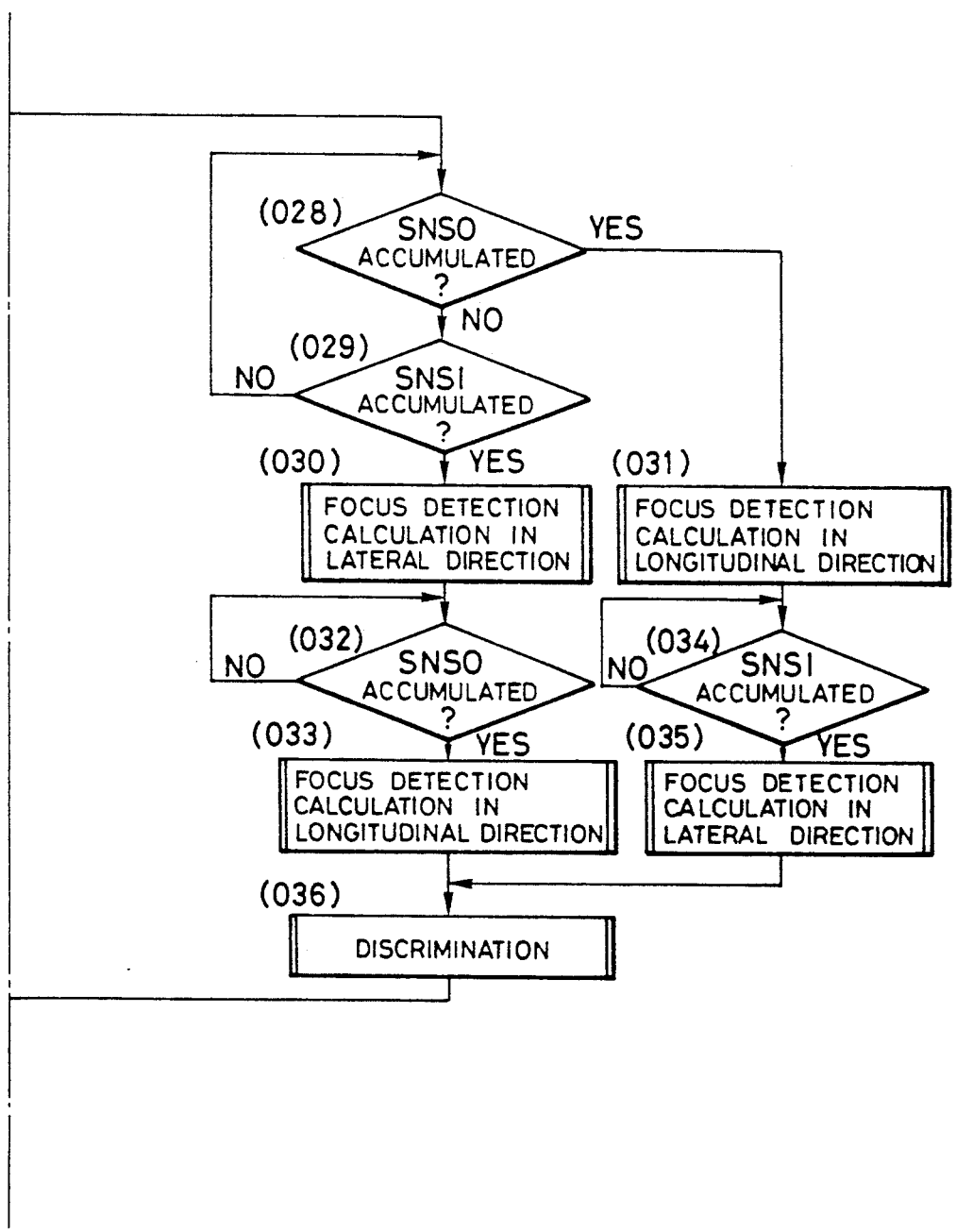

Referring to FIG. 9A, upon the second half depression of the release button, the state of the switch SW2 is detected in step (001). If the switch SW1 is ON in step (001), continuous photographing is performed, and the flow is branched to connector Ⓑ. However, if the switch SW1 is OFF, the flow advances to step (002) to perform normal AF control.

As described above, the switch SW2 is connected to the "interruption input terminal" of the computer PRS. When the switch SW2 is determined to be OFF in step (001), an interruption by the switch SW2 is allowed. Thereafter, when the switch SW2 is turned on, the flow is branched into a predetermined interruption step by the interruption function regardless of the presently executed operation, and a release operation is performed. When the release operation is completed, the SW2 interruption inhibit state is set. Since the release operation is not directly associated with the present invention, a detailed description thereof will be omitted. When a series of release operations (photographing operations) such as a mirror-up operation, a shutter curtain drive operation, a mirror-down operation, and a film winding operation are completed, the flow returns to the AF start operation in step (000). In step (001), the state of the switch SW2 is detected. In this case, if the switch SW2 is ON, a state immediately after the release operation, i.e., a state of continuous photographing is discriminated.

A state in which the switch SW2 is OFF will be described below.

A subroutine "accumulation start mode 1" is executed in step (002). This subroutine is illustrated in detail in the flow chart of FIG. 10A. In other words, this routine is a sensor accumulation start routine with normal sensor resetting.

The subroutine "accumulation start mode 1" will be described with reference to the flow chart in FIG. 10A. When this subroutine is called, constant "200" is set as a variable MAXINTO representing the longitudinal maximum accumulation time in step (101) after step (100). This value is determined in units of msec. More specifically, the longitudinal maximum accumulation time is set to 200 msec. In step (102), similarly, constant "200" is set as a variable MAXINTI representing the lateral maximum accumulation time.

Constant "20" is set as a variable BCNT in step (103). The variable BCNT defines the time TBTIME and is expressed in units of msec. Contact "20" means 20 msec. Therefore, the time TBTIME is set 20 msec after the start of accumulation.

In step (104), an accumulation time count variable INTCNT is cleared to 0.

In step (105), 8-bit serial data "$E0" (symbol $ represents a hexadecimal number) is sent to the sensor driver SDR. The hexadecimal "E0" corresponds to binary "11100000". The upper three bits of "1" represent "accumulation start", "destruction accumulation mode", and "AGC accumulation mode", respectively. Upon reception of the transmitted data, the sensor driver SDR starts the control operation in FIG. 5A. More specifically, the sensor unit is reset (i.e., the charges of the photoelectric transducer elements are cleared) and sensor charge accumulation is started in the "AGC mode".

In step (106), an interruption function is allowed so that the computer PRS can execute an "accumulation end interruption" by the accumulation end signals /TINTEO and /TINTEI from the driver SDR. In step (107), the subroutine returns to the main routine. The accumulation end interruptions are executed at the end of accumulation of the longitudinal and lateral sensor arrays.

Referring back to FIG. 9A, the computer PRS waits for the end of accumulation of the longitudinal and lateral sensor arrays in steps (003) and (004). The computer PRS waits until the end of accumulation of longitudinal the or lateral sensor array.

As described above, the end timings of accumulations of the longitudinal and lateral sensor arrays can be detected by the trailing edges of the signals /TINTEO and /TINTEI, respectively. These signal are connected to the terminal with an "input/output switching enable, input interruption control function". When the accumulated charge of the longitudinal sensor array becomes optimal and the signal /TINTEO from the driver SDR rises, the computer PRS detects its leading edge, and the interruption operations from step (050) are performed. Similarly, when the signal /TINTEI falls, the computer PRS determines that the accumulated charge of the lateral sensor array is optimal, and then performs the interruption operation from step (060).

Figure 9C:
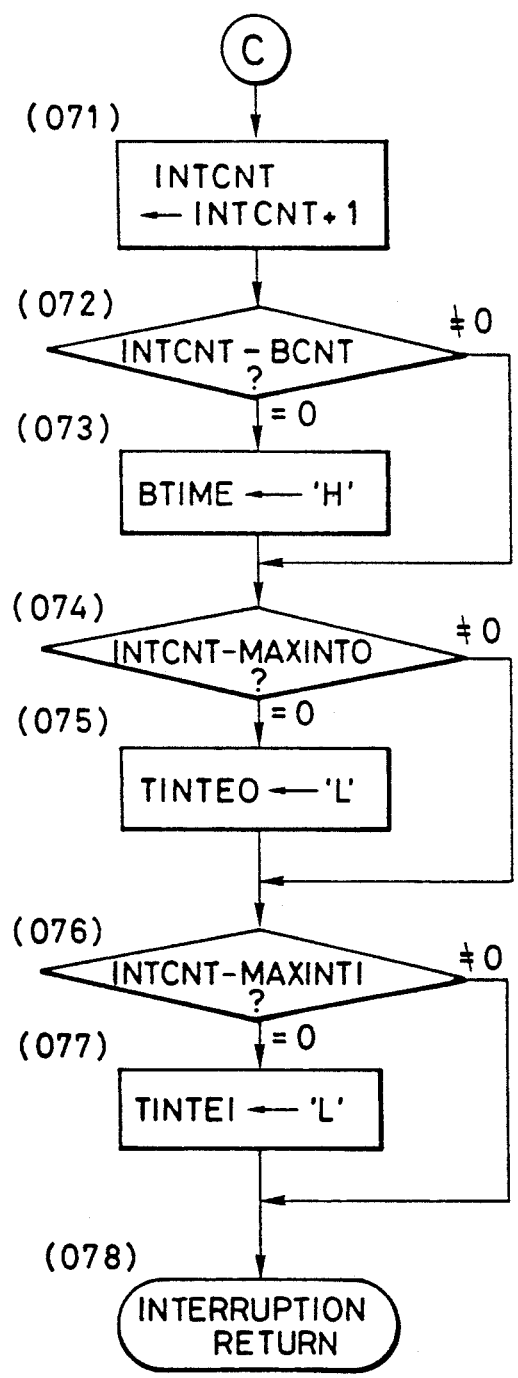

The accumulation time is monitored by interruption processing as "timer interruption" from step (070) in the flow of FIG. 9C. An interruption is generated, e.g., every msec. Timer interruption processing will be described with reference to FIG. 9C.

When a timer interruption is generated, an accumulation time counter INTCNT is incremented by one in step (071) through step (070) and connector Ⓒ.

In step (072), the count of the counter INTCNT is compared with a value in a RAM area BCNT. If a noncoincidence is detected, the flow is branched to step (074). However, if a coincidence is detected, the signal BTIME is set at "H" level in step (073). BCNT is a time in units of msec for giving time TBTIME.

When the count of the counter INTCNT does not coincide with the value of the RAM area MAXINTO in step (074), the flow is branched into step (076). Otherwise, the signal /TINTEO is set at "L" level in step (075). MAXINTO represents the longitudinal maximum accumulation time in units of msec. When the count of the accumulation time counter coincides with the longitudinal maximum accumulation time, the signal /TINTEO is set at "L" level, thereby forcibly terminating the accumulation of the longitudinal sensor array.

In steps (076) and (077), the count of the counter INTCNT is compared with the lateral maximum accumulation time MAXINTI. If the count coincides with the lateral maximum accumulation time MAXINTI, the accumulation of the lateral sensor array is forcibly ended.

While the computer PRS waits for the end of accumulation, a timer interruption is generated every msec, and the accumulation time is monitored. A predetermined operation is performed between the time TBTIME and the maximum accumulation time TMAXINT of both the longitudinal and lateral sensor arrays.

Referring back to FIG. 9A, while the computer PRS waits for determinations in steps (003) and (004), when the accumulated charge of the longitudinal sensor array becomes optimal, the flow is branched into step (050) by the interruption generated the falling of the signal /TINTEO.

In step (051), the value of the accumulation time counter is stored in an RAM area INTTMO. At the same time, a timer value TIMER of a self-running timer inside the computer PRS is stored in a RAM area ENDTMO.

Figure 5C:
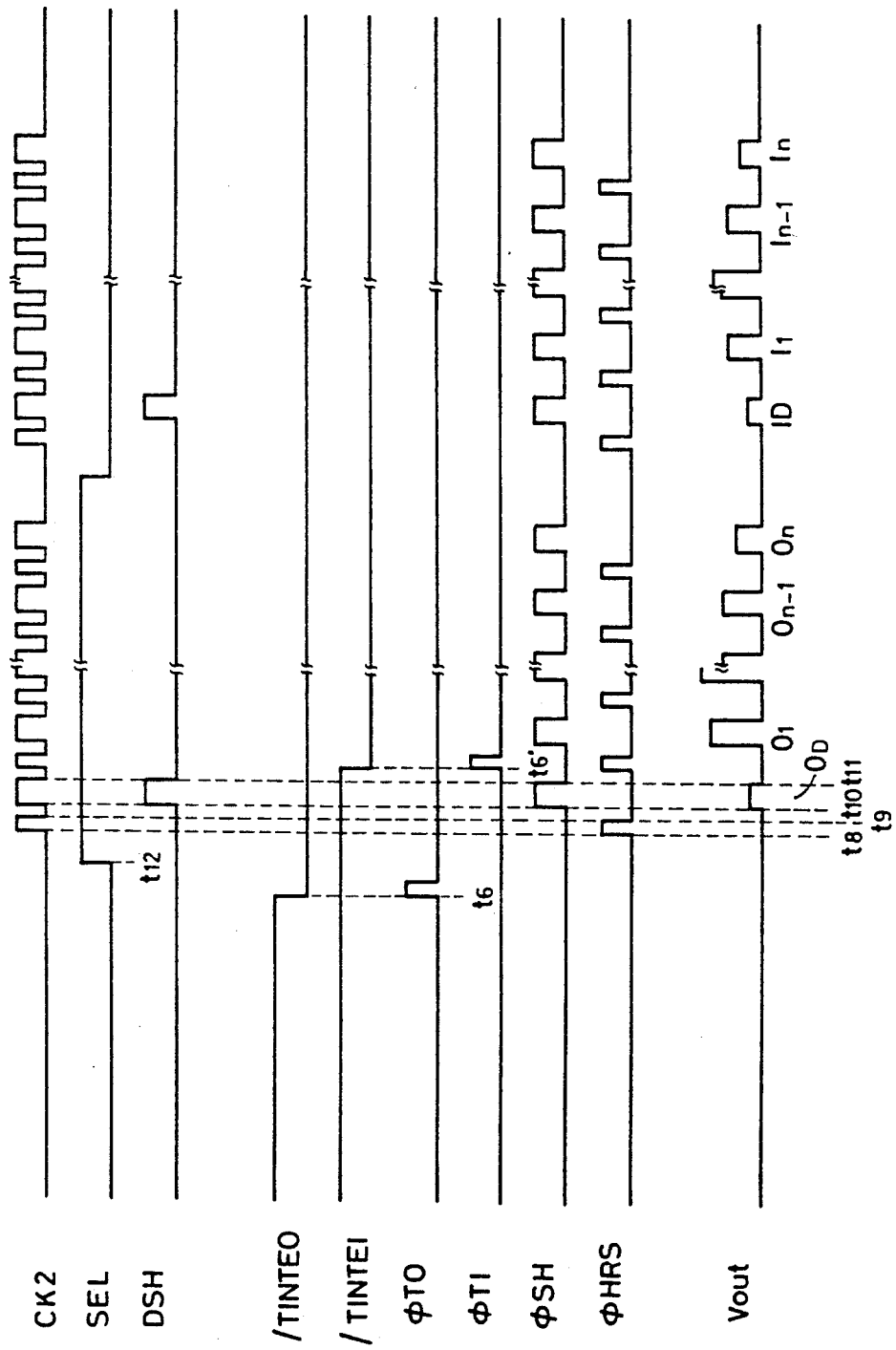

In step (052), an image signal from the longitudinal sensor array SNSO is input. This operation will be described in more detail with reference to FIG. 5C. FIG. 5C shows a relationship between the signals, clock pulses, and the image signal after the end of accumulation as a function of time.

When an image signal is read from the longitudinal sensor array, the signal SEL is set at "H" level (t12) to select the longitudinal sensor array. The sensor drive clock signals $\phi$SH and $\phi$HRS are generated on the basis of the clock signal CK2 from the computer PRS. Image information appears in the sensor image signal Vout during the "H" period of the signal $\phi$SH.

Since the first pixel is a shielded pixel, its signal potential is held. The signal DSH is set at "H" level during the "H" period of the signal $\phi$SH of the first pixel. In response to the signal DSH, the sensor drive SDR causes the capacitor DHC to hold the shielded pixel potential. Thereafter, longitudinal sensor image signals $O_1, \ldots, O_{n-1}, O_n$ of the longitudinal sensor array are sequentially amplified and output every clock signal CK2. The computer PRS performs A/D conversion of the image signal at timings of the signal CK2 output thereby, and the digital data is stored in the RAM area.

When a lateral sensor image signal is read, the signal SEL is set at "L" level to select the lateral sensor array. The subsequent operations are the same as those described above.

A description will be given again with reference to the flow chart of FIG. 9A.

When the read operation of the longitudinal sensor array is completed in step (052), the subroutine is returned to the main routine in step (053). The return destination is step (003) or (004) in the main routine.

When the read operation of the longitudinal sensor array SNSO is completed, the flow advances from step (003) to step (006).

In step (006), a defocus amount detection calculation of the photographing lens is performed on the basis of the image signal from the longitudinal sensor array. A detailed calculation method is disclosed in Japanese Patent Application No. 61-160824 filed by the present applicant, and a detailed description thereof will be omitted.

An interruption is allowed during execution of step (006). When the accumulation of charges of the lateral sensor array SNSI is completed, the flow is branched into step (060) in the same manner as in the longitudinal sensor array. The read operation of the lateral sensor array SNSI from step (060) is performed. The value of the accumulation time counter INTCNT is stored in a RAM area INTTMI, and the self-running timer value is stored in an area ENDTMI. The interruption is returned from step (063) to the main routine.

When an interruption is generated during execution of step (006), the interruption is returned to the main routine, and the operation in step (006) is restarted. When the focus detection calculation in the longitudinal direction is completed, the image signal of the lateral sensor array has already been read. The flow advances to step (010) through step (009).

When an interruption is generated after the computer PRS waits for the end of accumulation of the lateral sensor array in step (009) upon completion of step (006), the interruption is returned to the main routine, and the flow immediately advances to step (010).

A focus detection calculation is performed on the basis of the image signal from the lateral sensor array in step (010). At the end of calculation, the flow advances to step (011).

The flow in which the end of accumulation of the longitudinal sensor array is earlier than that of the lateral sensor array has been described. When the end of accumulation of the lateral sensor array is earlier than that of the longitudinal sensor array, the flow advances to step (011) through steps (005), (007), and (008).

Up to step (011), the focus detection calculations in both longitudinal and lateral directions are completed, a defocus amount DEFO and a contrast amount ZDO are obtained in the "focus detection calculation in the longitudinal direction, and a defocus amount DEFI and a contrast amount ZDI are obtained in the "focus detection calculation in the lateral direction".

In step (011), validity of the focus detection calculations is checked. That is, since the focus detection results and the image signal contrast amounts have been obtained in steps (005) and (008) or steps (006) and (010) prior to step (011). In step (011), the contrast amounts of the image signals in the vertical and lateral directions are checked. If both contact levels are low, the focal detection results are determined to be not valid. In this case, the flow advances to step (016). If one of the contrast amounts of the longitudinal and lateral sensor arrays is sufficient, the flow advances to step (012).

A subroutine "discrimination" is executed in step (012).

Figure 11:
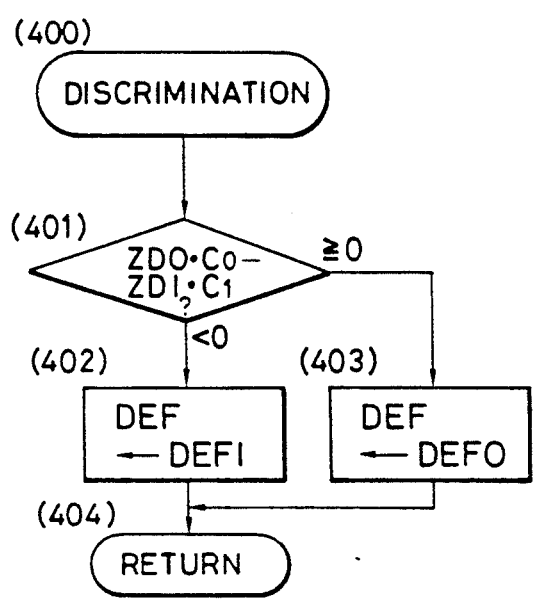

The flow chart of the subroutine "discrimination" is shown in FIG. 11. In this subroutine, one of the focus detection results by the longitudinal and lateral sensor images is employed on the basis of the magnitudes of the contrast levels of the images from the longitudinal and lateral sensor arrays. In this case, the contrast values are weighted, and the weighted values are compared with each other. In the focus detection optical system of this embodiment, the base line length in the longitudinal direction is different from that in the lateral direction. When the contrast level is kept unchanged, a better focus detection result is obtained in the longitudinal direction.

Weighting coefficients CO and CI (wherein CO>CI) are multiplied with the contrast amounts ZDO and ZDI obtained based on the longitudinal and lateral sensor images, and the products are compared with each other. If condition ZDO·CO≧ZDI·CI is established, the flow advances to step (403). However, if condition ZDO·CO<ZDI·CI is established, the flow advances to step (402). In step (403), the longitudinal focus detection result DEFO is defined as the final defocus amount DEF. In step (402), the lateral focus detection result DEFI is defined as the final defocus amount DEF. The "discrimination" subroutine is returned to the main routine in step (404).

Referring back to the flow chart in FIG. 9(A), if the employed defocus amount DEF is smaller than a predetermined amount, an in-focus state is determined in step (013), and the flow advances to step (014). Otherwise, a defocus state is determined, and the flow advances to step (015).

When the in-focus state is detected, the in-focus display is performed on the display DSP in step (014). However, when the defocus state is detected, the lens is driven on the basis of the defocus amount in step (015). The flow returns to step (001) again, and the next focus detection operation is executed. A method of driving the lens in step (015) is disclosed in Japanese Patent Application No. 61-160824 filed by the assignee of the present application, and a detailed description thereof will be omitted.

When both the longitudinal and lateral image signals are determined to have low contrast levels in step (011), the flow advances to step (016).

Accumulation mode detection is performed in step (016). If mode 1 is determined, the flow advances to step (018). Otherwise, the flow advances to step (017). Since the flow in which the accumulation mode 1 executed in step (002) has been described, the operations from step (018) will be described below. In step (018), the peak values of the image signals in the longitudinal and lateral directions, which were read in steps (052) and (062) are detected. If the peak values are sufficiently large (i.e., larger than the predetermined values), the flow advances to step (017). Otherwise, the flow advances to step (019). That is, when the peak values are sufficiently large, the computer PRS determines that a further improvement cannot be expected by the sensor accumulation control. In this case, search lens driving is performed in step (017). The search lens driving is a control process for increasing the contrast level during driving of the lens when an object contrast is low (i.e., after the lens is driven by a predetermined amount, the flow returns to step (001); or the flow returns to step (001) while the lens is driven). When the contrast level is increased, the lens is stopped, and the flow advances to step (012)). This control process is disclosed in detail in Japanese Patent Application No. 61-160824.

When the peak values of the image signals are smaller than the predetermined values in step (018), the peak values may be increased with an increases in accumulation time, so that the contrast levels can be increased accordingly. For this purpose, accumulation control is performed in steps (019), (020), and (021).

The computer PRS determines in step (019) whether the actual accumulation time reaches the predetermined maximum accumulation time. If YES in step (019), the flow advances to step (021) to set an "accumulation start mode 3". Otherwise, the flow advances to step (020) to set an "accumulation start mode 2".

In the photoelectric transducer elements of this embodiment of the present invention, unlike the sensor such as a CCD sensor, the accumulated charge is not cleared after the read operation and can be read again to perform the "not destruction read access" (control in FIG. 5B). When the actual accumulation time does not reach the predetermined time, the subroutine "accumulation start mode 2" is executed to control the "not destruction read access" in step (020).

Figure 10A:
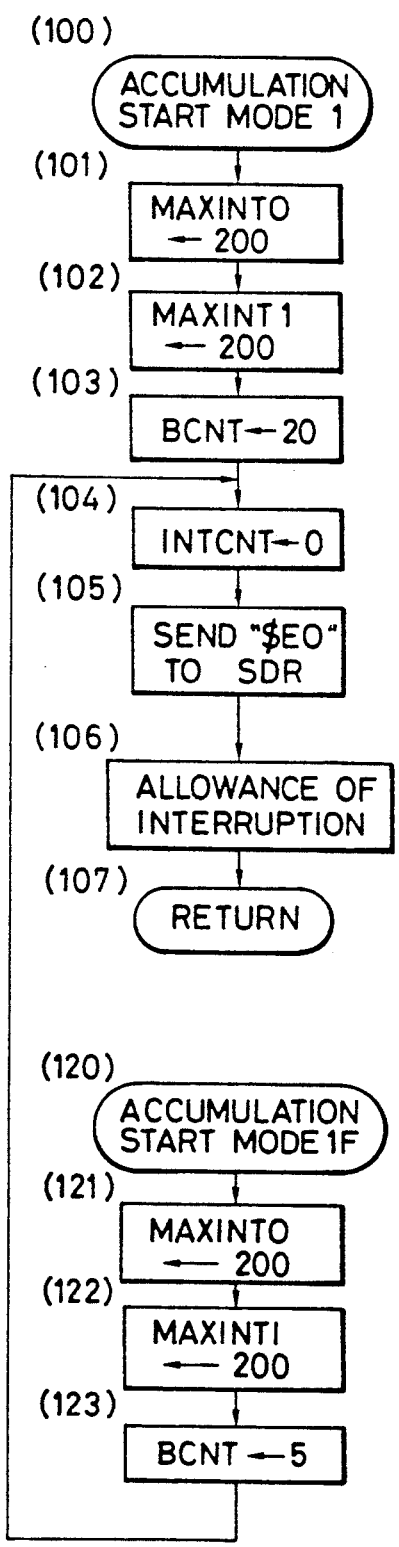
FIGS. 10A, 10B, and 10C, and FIG. 11 are program flow charts for explaining operations of the automatic focusing control apparatus for the camera according to the present invention shown in FIG. 2.
Figure 10B:
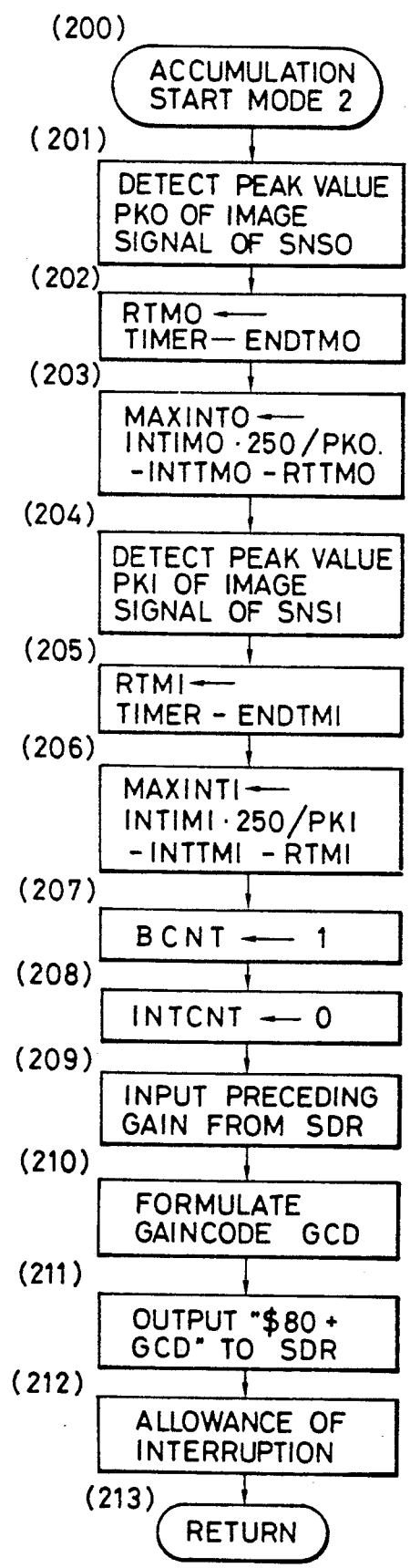

The flow chart of the subroutine "accumulation start mode 2" in step (020) is shown in FIG. 10(B).

The basic concept of the "not destruction read access" will be described below. When the dynamic range of the sensor output is not matched with the range of the processing system, the image signals are read again after a lapse of an accumulation time assumed so that the peaks of the image signals become optimal, on the basis of the peak values of the image signals obtained in the normal read operation and the corresponding accumulation time.

An accumulation time EXINTTM for obtaining optimal peak values is defined as follows if an optimal peak value is given as a count "250" (if the resolution of the A/D converter of the computer PRS is given as 8 bits, the optimal peak value is defined with respect to the 8-bit full-range):

$$EXINTTM = (250/PK) \cdot INTTM$$

where PK is the peak value, and INTTM is the accumulation time.

Since the predetermined period of time has elapsed from the end of the read operation up to the present since focus detection operations have been performed. If the predetermined period of time is defined as RTM, a time TINTTM from the present moment to the read timing is given as follows:

$$RINTTM = EXINTTM - INTTM - RTM$$

When the time RINTTM is used as the maximum accumulation time, and the image signal is read in the "not AGC mode", the peak value of the image signal is presumed as the A/D-converted digital value as a count "250".

When the subroutine "accumulation start mode 2" is called, a peak value PKO of the image signal from the longitudinal sensor array SNS$\overline{O}$ is detected in step (201) of FIG. 10B through step (200). In step (202), a variable ENDTMO is subtracted from the self-running timer value TIMER inside the computer PRS which represents the present time. A difference is stored as the variable RTMO. Since the TIMER value at the end of longitudinal accumulation is already stored. The value RTMO obtained by subtracting ENDTMO from the present time represents a lapse of time from the end of accumulation to the present time.

In step (203), a period from the present moment to the read start timing is calculated on the basis of the above equation to optimize the peak value. The calculated value is stored as the variable MAXINTO. The variable MAXINTO is a variable for defining the maximum accumulation time of the longitudinal sensor array and represents a period required to complete the "not destruction read access". Similar calculations are performed for the lateral sensor arrays in steps (204) to (206). A remaining period for optimizing the peak value of the image signal from the lateral sensor array is set as the variable MAXINTI.

The variable BCNT is set to "1" in step (207). The variable BCNT is for giving the time TBTIME. Since the accumulation control which is being described herein is given as the "not destruction" control. The gain mode has thus already been determined, and the value of the MTIME may be any value. However, "1" is stored to determine the gain immediately after the start of accumulation. In step (208), the accumulation time counter INTCNT is cleared.

The gains in the previous accumulation operation are input from the driver SDR in step (209).

A gain code GCD for the present "not destruction read access" is generated in step (210). In step (211), the gain code is added to a control command "$80" of the sensor driver SDR, and the sum is output to the driver SDR. For example, if gains in both the longitudinal and lateral directions are given as 1, the gain code GCD is "$00", and the control command sent to the driver SDR is "$80". When the hexadecimal value "80" is expressed as a binary value "10000000". The upper three bits "100" represent the "accumulation start", the "not destruction accumulation mode", and the "not AGC accumulation mode", respectively. The lower four bits represent that the gains of the longitudinal and lateral directions in the "not AGC accumulation" are set to 1 each. If the previous gain in the longitudinal direction is 2 and that in the lateral direction is 8, the gain code GCD is given as a binary value "00001011". In this case, the command sent to the driver SDR is given as "$87". The driver SDR receives these commands to start the accumulation operation without resetting the sensor and without using the AGC function. In practice, the driver SDR is not operated for the sensor unit SNS. Since the sensor unit of this embodiment of the present invention continues accumulation without being reset, the driver SDR itself is set in the status as "during accumulation".

In step (212), the PRS interruption function by the accumulation end signals /TINTEO and /TINTEI is allowed. The interruption subroutine is then returned to the main routine in step (213). In the AGC accumulation mode, the sensor driver SDR disables the signals /TINTEO and /TINTEI by the AGC function, and the accumulation end signals are stored in the computer PRS. However, in the "not AGC accumulation mode", the computer PRS itself disables the signals /TINTEO and /TINTEI after a lapse of the predetermined period (MTXINTO and MAXINTI), thereby forcibly ending the accumulation. In this case, the same operations as in the lapse of the maximum accumulation time are performed.

Referring back to FIG. 9A, in step (019), if the normal accumulation time reaches the maximum accumulation time, the computer PRS determines that the accumulation of the sensor is excessively performed due to the processing time for focus detection calculations and the like and the peak value of the image signal read at this moment has a value larger than the optimal value. In this case, the flow is branched into step (021), and the subroutine "accumulation start mode 3" is executed.

Figure 10C:
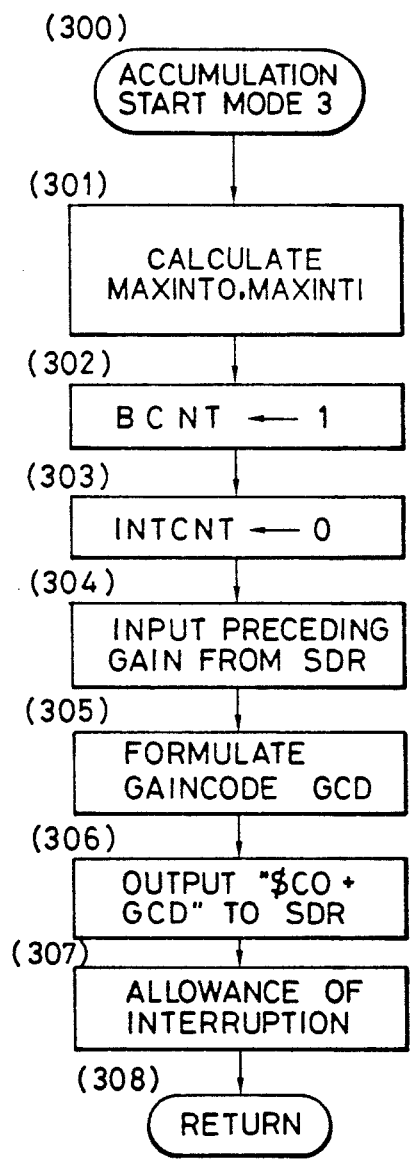

The flow chart of the subroutine "accumulation start mode 3" is shown in FIG. 10C. This mode is set when the actual accumulation time exceeds the maximum accumulation time to read the image signal in the "not destruction read access".

When the subroutine "accumulation start mode 3" is called, the accumulation times of the longitudinal and lateral sensor arrays are calculated in step (301) through step (300). The accumulation times EXINTTM for obtaining optimal peak values are calculated in the longitudinal and lateral directions, and the calculated values are stored as the maximum accumulation time variables MAXINTO and MAXINTI. In step (302), constant "1" is set in the time TBTIME control value BCNT because this accumulation operation is the "not AGC accumulation mode" and their gains have already been determined.

In step (303), the accumulation time counter INTCNT is cleared.

In steps (304) and (305), the previous gains are input from the sensor driver SDR, and the gain code GCD for the present accumulation operation on the basis of the previous gains is generated.

In step (306), the gain code GCD is added to the control command "$C0" of the driver SDR, and the sum is sent to the driver SDR. In this case, the hexadecimal value "C0" is expressed as a binary value "11000000". The upper three bits, "110", represent the "accumulation start", the "not destruction accumulation mode", and the "not AGC accumulation mode", respectively. Upon reception of this command, the sensor driver SDR starts the accumulation without using the AGC function upon resetting of the sensor unit.

The computer PRS allows an accumulation end interruption in step (307), and the subroutine "accumulation start mode 3" is returned to the main routine in step (308). Thereafter, the accumulation continues until the computer PRS sets the accumulation end signals /TINTEO and /TINTEI to "L" level.

Referring back to FIG. 9A, when the peak value of the image signal read by the normal accumulation is not an optimal value in step (020) or (021), the accumulation operation is performed to obtain the optimal peak value by AGC control. After the accumulation is started in the "accumulation start mode 2" or the "accumulation start mode 3", the flow returns to step (003), and the computer PRS waits for the end of accumulation in the "mode 2" or the "mode 3".

More specifically, when the accumulation is started in the "mode 2" or the "mode 3", the time MAXINT is counted in "timer interruption" in step (070). After the lapse of the time MAXINT, the signals /TINTEO and /TINTEI are set at "L" level to terminate the accumulation. At the same time, the image signals are input in steps (050) and (060).

Thereafter, the focus detection calculations are performed in steps (005) to (010), and the flow advances to steps (011) to (014) or (015). When the image signal obtained by the accumulation in the "mode 2" or the "mode 3" is discriminated as a low-contrast signal, the flow advances from step (016) to step (017). The search driving is performed without setting the "mode 2" or the "mode 3".

The above operations are repeated during the ON state of the switch SW1, and the lens is moved to the in-focus position.

An operation of the AF control apparatus in the continuous photographing mode according to the present invention will be described with reference to FIG. 9B. In the continuous photographing mode, since the switch SW2 is ON upon the second half depression of the release button even after the end of the previous photographing operation, the flow is branched from step (001) of FIG. 9A to step (022) of FIG. 9B through connector Ⓑ.

In step (022), a subroutine "accumulation start mode 1F" is executed to cause the sensor unit to start normal accumulation. Gains in this mode are set to be slightly higher than those in the "accumulation start mode 1". That is, the accumulation time can be shortened by increasing the gain even if the same object is subjected to distance measurements, thereby improving the response characteristics of the focus control operation.

The flow of the subroutine "accumulation start mode 1F" is shown in FIG. 10A. When this subroutine is called, constant "200" is set as each of maximum accumulation time variables MAXINTO and MAXINTI of the longitudinal and lateral sensor arrays in steps (121) and (122) through step (120). Step (123) in this subroutine is different from the corresponding portion in the "accumulation start mode 1". Constant "5" is set as the time TBTIME control variable BCNT. Constant "5" represents 5 msec. Although the constant is set as 20 in the "mode 1", the constant is set to "5" in the "mode 1F" to set the time TBTIME earlier, so that the gains determined by the driver SDR during accumulation are set to be higher.

The flow advances to step (104), and the same control operations as in the "mode 1" are performed.

Referring back to FIG. 9B, the "accumulation start mode 1F" is returned to the main routine. In step (023), the computer PRS checks which one of the image signals from the longitudinal and lateral sensor arrays is employed as the final result. If the longitudinal focus detection result is employed, the flow advances to step (024). If the lateral sensor is employed, the flow advances to step (026). If no focus detection operation is performed because both sensors show low contact, the flow advances to step (028). Since a quick focus adjustment is needed in continuous photographing, in the embodiments of the present invention, if the longitudinal sensor is employed in the preceding focus detection, the same longitudinal sensor is used for the following focus detection. Also if the lateral sensor is employed in the preceding focus detection, the lateral sensor is successively used for the next operation. Because only one sensor is used, comprised with a case in which two sensors are used for a focus detection operation, the operation time is shortened in reading-out of the image signal and in the focus detection calculation. However, when the two sensors are both in the low-contrast state, the two sensors are used as in a normal focus detection since there is no sensor to be selected.

When the flow is branched from step (023) to step (024), the computer PRS waits for the end of the read operation of the image signals from the longitudinal sensor arrays in the mode 1F.

When the read operation of the longitudinal sensor image signals is completed as in the interruption processing shown in steps (050) and (070), the flow is shifted to step (025), and focus detection calculations using the longitudinal sensor image signals are performed.

When the lateral sensor image signal is used in the previous focus detection, the computer PRS waits for the end of the read operation of the lateral sensor image signal in step (026). Subsequently, in step (027), focus detection calculations using the lateral sensor image signals are performed.

When both the longitudinal and lateral sensor image signals have low contrast levels, focus detection calculations using both the longitudinal and lateral sensor image signals are performed in steps (028) to (035). In step (036), the computer PRS determines which one of the sensor image signals is selected as in the normal focus detection operation. These steps are the same as steps (003) to (010), and a detailed description thereof will be omitted.

After the focus detection operation is completed, the contrast level is detected in step (037). If the result contrast value is smaller than a predetermined value, i.e., if a low contrast is detected, the flow is not branched, and no lens driving is performed. However, if the contrast value is larger than the predetermined value, the flow advances to step (038), and the lens is driven on the basis of the detected defocus amount.

When lens driving in the continuous photographing mode is completed, the computer PRS waits for an interruption from the switch SW2. If the switch SW2 is kept ON at this moment, the release operation is executed by the interruption function. When the release operation is completed, the SW2 interruption is inhibited.

After the release operation is completed, the flow returns to step (001), and a new focus control operation is started.

In the above embodiment, the gains are increased in the continuous photographing mode. However, there are other conditions which require a short response time in AF control in accordance with operating states of the camera. As in "search lens driving" in step (017) of FIG. 9A, the present invention is also effective for focus control during lens driving.

In this embodiment, a nondestructive read sensor is used as an accumulation type sensor. However, an accumulation type sensor such as a CCD sensor may be employed in the present invention.

In the embodiment described above, the sensor used in the continuous photographing mode is the sensor used in the previous focus detection cycle. However, for example, the lateral sensor array may be preferentially used.

The sensor described above comprises a nondestructive read sensor as a photoelectric transducer element. However, the present invention is also effective for a focus detection sensor using, e.g., a CCD sensor.

In the embodiment described above, focus detection processing is performed for two sensor outputs, and then weighted contrast levels of the image signals are compared with each other to select one of the detection results. However, image signals may be selected prior to focus detection processing. In this case, focus detection processing is performed for only the selected image signals.

In the above embodiment, the two focus detection mechanisms are provided. However, the number of focus detection mechanisms is not limited two, but can be three or more.

What is claimed is:

1. A focus detection apparatus comprising:
a plurality of accumulation-type sensor sections for respectively receiving light from different areas, each said sensor section starting a signal accumulation operation in response to a first signal;
a monitor circuit for independently monitoring a signal accumulation state of each said sensor section, said monitor circuit outputting a second signal when the accumulation state of said each sensor section reaches a predetermined state;
a reading circuit for supplying said second signal to a said sensor section which has reached said predetermined state, the said sensor section to which said second signal is supplied outputting the accumulated signal before another said sensor section outputs its accumulated signal; and
a signal processing circuit for receiving said accumulated signal from the said sensor section to which said reading circuit output said second signal, and for starting a focus calculation, whereby, if the accumulation state of the said sensor section reaches the predetermined state, the focus calculation is performed based on the accumulated signal of the said sensor section even if the accumulation operation of other said sensor sections is still being performed.

2. A focus detection apparatus according to claim 1, wherein each sensor section comprises a first sensor portion for receiving the light and a second sensor portion for monitoring a signal producing state of said first sensor portion.

3. A focus detection apparatus according to claim 1, wherein said monitor circuit compares a monitor state of said a sensor section with a predetermined value and outputs the second signal when the monitor state reaches the predetermined state.

4. A focus detection apparatus according to claim 1, wherein the signal accumulated at each sensor section is serially output via a common output terminal.

5. A focus detection apparatus according to claim 1, wherein said signal processing circuit immediately starts an operation for focus detection upon receipt of the accumulated signal from the said sensor section.

6. A focus detection apparatus according to claim 5, wherein said signal processing circuit discontinues the focus detection operation when, during a focus detection operation for a signal from one of said sensor sections, a said second signal is supplied to another sensor section, and wherein said signal processing circuit starts said discontinued focus detection operation after completion of the output of the signal from said sensor section which received said second signal.

7. A focus detection apparatus comprising:
a plurality of accumulation-type sensor sections located at different positions, each said sensor section receiving light flux and starting to operate substantially simultaneously in response to a first signal;

a monitor circuit for independently monitoring a signal accumulation state of each said sensor section, said monitor circuit outputting a second signal when the accumulation state of each sensor section reaches a predetermined state; and a reading circuit for supplying said second signal to a said sensor section which has reached said predetermined state, the said sensor section to which said second signal is supplied outputting the accumulated signal before another said sensor section outputs its accumulated signal; and a signal processing circuit for receiving said accumulated signal from the said sensor section to which said reading circuit output said second signal, and for performing a focus calculation, whereby, if the accumulation state of the said sensor section reaches the predetermined state, the focus calculation is performed based on the accumulated signal of the said sensor section even if the accumulation operation of other said sensor sections is still being performed.

8. A focus detection apparatus according to claim 7, wherein each sensor section comprises a first sensor portion for receiving the light and a second sensor portion for monitoring a signal generation state of said first sensor portion.

9. A focus detection apparatus according to claim 7 wherein said monitor circuit compares a monitor state of said a sensor section with a predetermined value and outputs the second signal every time the monitor state reaches the predetermined state.

10. A focus detection apparatus according to claim 7, wherein the signal accumulated at said each sensor section is serially output via a common output terminal.

11. A focus detection apparatus according to claim 7, wherein said signal processing circuit immediately starts an operation for focus detection upon receipt of the accumulated signal from the said sensor section.

12. A focus detection apparatus according to claim 11, wherein said signal processing circuit temporarily discontinues the focus detection operation when, during the focus detection operation for a signal from one of said sensor sections, a said second signal is supplied to another sensor section, and wherein said signal processing circuit starts said discontinued focus detection operation after completion of the output of the signal from said another sensor section which received said second signal.

13. A focus detection apparatus comprising:

a plurality of accumulation-type sensor sections for respectively receiving light from different areas, each said sensor section starting the signal accumulation operation substantially simultaneously in response to a first signal;

an accumulation time control circuit for independently controlling the signal accumulation time of each said sensor section, said control circuit outputting a second signal after expiration of the accumulation time of each said sensor section;

a reading circuit for outputting the second signal to a said sensor section whose said accumulation time has expired, the said sensor section to which said second signal is supplied outputting said accumulated signal before another said sensor section outputs its accumulated signal; and a signal processing circuit for receiving said accumulated signal from the said sensor section to which said reading circuit output said second signal, and for performing a focus calculation, whereby, if the accumulation time of a said sensor section has expired, the focus calculation is performed based on the accumulated signal of the said sensor section even if the accumulation operation of other said sensor sections is still being performed.

14. A focus detection apparatus according to claim 13, wherein the signal accumulated at each section is serially output via a common output terminal.

15. A focus detection apparatus according to claim 13, wherein said signal processing circuit immediately starts an operation for focus detection upon receipt of the accumulated signal from the said sensor section.

16. A focus detection apparatus according to claim 15, wherein said signal processing circuit temporarily discontinues the focus detection operation when, during the focus detection operation for a signal from one of said sensor sections, a said second signal is supplied to another said sensor section, and wherein said signal processing circuit starts said discontinued focus detection operation after completion of the output of the signal from said another sensor section which received said second signal.

* * * * *

UNITED STATES PATENT AND TRADEMARK OFFICE
CERTIFICATE OF CORRECTION

PATENT NO. : 5,151,732
DATED : September 29, 1992
INVENTOR(S) : AKASHI ET AL.

It is certified that error appears in the above-identified patent and that said Letters Patent is hereby corrected as shown below:

Title Page:

AT [56] US PATENT DOCUMENTS

"Equchi et al. should read --Eguchi et al.--.

COLUMN 9

Line 41, "SNSAMP. By" should read --SNSAMP. ¶ By--.

COLUMN 11

Line 2, "manner" should read --manner as--.

COLUMN 15

Line 56, "SW15')," should read --SW15'), and--.
Line 61, "AND20. The" should read --AND20. ¶ The--.

COLUMN 20

Line 42, "generated" should read --generated upon--.

COLUMN 23

Line 8, "step (012))." should read --step (012).--.

COLUMN 24

Line 25, "control. The" should read --control, the--.
Line 41, "When" should read --Then--.

UNITED STATES PATENT AND TRADEMARK OFFICE
CERTIFICATE OF CORRECTION

PATENT NO. : 5,151,732
DATED : September 29, 1992
INVENTOR(S) : AKASHI ET AL.

It is certified that error appears in the above-identified patent and that said Letters Patent is hereby corrected as shown below:

<u>COLUMN 28</u>

Line 8, "limited" should read --limited to--.

<u>COLUMN 29</u>

Line 27, "claim 7" should read --claim 7,--.

Signed and Sealed this

Ninth Day of November, 1993

Attest:

BRUCE LEHMAN

Attesting Officer    Commissioner of Patents and Trademarks